US007710433B2

(12) United States Patent
Holub

(10) Patent No.: US 7,710,433 B2
(45) Date of Patent: May 4, 2010

(54) METHODS AND APPARATUS FOR CALIBRATING A COLOR DISPLAY

(75) Inventor: Richard A. Holub, Rochester, NY (US)

(73) Assignee: Rah Color Technologies LLC, Rochester, NY (US)

( * ) Notice: Subject to any disclaimer, the term of this patent is extended or adjusted under 35 U.S.C. 154(b) by 294 days.

(21) Appl. No.: 11/442,882

(22) Filed: May 30, 2006

(65) Prior Publication Data

US 2006/0221093 A1    Oct. 5, 2006

Related U.S. Application Data

(62) Division of application No. 09/832,553, filed on Apr. 11, 2001, now Pat. No. 7,102,648.

(60) Provisional application No. 60/195,837, filed on Apr. 11, 2000.

(51) Int. Cl.
*G09G 5/02*     (2006.01)

(52) U.S. Cl. .................. 345/589; 345/590; 345/593; 345/594

(58) Field of Classification Search ................ 345/589, 345/590, 593, 594, 597; 382/167; 358/518, 358/520
See application file for complete search history.

(56) References Cited

U.S. PATENT DOCUMENTS

| | | | |
|---|---|---|---|
| 4,658,286 A | 4/1987 | Schwartz et al. | |
| 4,677,465 A | 6/1987 | Alkofer | |
| 4,700,218 A | 10/1987 | Thomsen et al. | |
| 4,729,016 A | 3/1988 | Alkofer | |
| 4,745,465 A | 5/1988 | Kwon | |
| 4,843,573 A | 6/1989 | Taylor et al. | |
| 4,939,581 A | 7/1990 | Shalit | |
| 4,941,038 A | 7/1990 | Walowit | |
| 5,040,889 A | 8/1991 | Keane | |
| 5,049,986 A | 9/1991 | Aono et al. | |
| 5,083,195 A | 1/1992 | Evelin | |
| 5,115,229 A | 5/1992 | Shalit | |
| 5,146,328 A | 9/1992 | Yamasaki et al. | |
| 5,177,602 A | 1/1993 | Fujimori | |

(Continued)

FOREIGN PATENT DOCUMENTS

JP    07-095427    4/1995

(Continued)

OTHER PUBLICATIONS

Ohno, Y. et al., Four-Color Matrix Method for Correction of Tristimulus Colorimeters, Proc., IS&T Fifth Color Imaging Conference, 301-305 (1997).

(Continued)

*Primary Examiner*—Hau H Nguyen
(74) *Attorney, Agent, or Firm*—Kenneth J. Lukacher

(57) ABSTRACT

Improved methods are provided for calibrating color on a color display coupled to a computer, which are useful for obtaining calibrated data in a virtual proof network for enabling different color devices to render consistent color. Methods involve user interactions with screens on the display to set color display parameters. An apparatus is also provided for calibrating a sensor which may be used for measuring color of a display in one or more of these methods.

35 Claims, 17 Drawing Sheets

U.S. PATENT DOCUMENTS

| | | |
|---|---|---|
| 5,212,546 A | 5/1993 | Arazi et al. |
| 5,231,481 A | 7/1993 | Eouzan et al. |
| 5,272,518 A | 12/1993 | Vincent |
| 5,278,641 A | 1/1994 | Sekizawa et al. |
| 5,309,257 A | 5/1994 | Bonino et al. |
| 5,345,315 A | 9/1994 | Shalit |
| 5,363,197 A | 11/1994 | Ohno et al. |
| 5,414,538 A | 5/1995 | Eschbach |
| 5,416,890 A | 5/1995 | Beretta |
| 5,426,517 A | 6/1995 | Schwartz |
| 5,428,720 A | 6/1995 | Adams, Jr. |
| 5,444,556 A | 8/1995 | Ito et al. |
| 5,450,502 A | 9/1995 | Eschbach et al. |
| 5,459,678 A | 10/1995 | Feasey |
| 5,495,428 A | 2/1996 | Schwartz |
| 5,499,040 A | 3/1996 | McLaughlin et al. |
| 5,512,961 A | 4/1996 | Cappels, Sr. |
| 5,528,261 A | 6/1996 | Holt et al. |
| 5,532,848 A | 7/1996 | Beretta |
| 5,539,539 A | 7/1996 | Fujimoto et al. |
| 5,544,258 A | 8/1996 | Levien |
| 5,554,912 A | 9/1996 | Thayer et al. |
| 5,561,459 A | 10/1996 | Stokes et al. |
| 5,596,416 A | 1/1997 | Barry et al. |
| 5,604,596 A | 2/1997 | Ukai et al. |
| 5,638,117 A | 6/1997 | Engeldrum et al. |
| 5,668,890 A | 9/1997 | Winkelman |
| 5,680,333 A | 10/1997 | Jansson |
| 5,739,809 A | 4/1998 | McLaughlin et al. |
| 5,745,657 A | 4/1998 | Barry et al. |
| 5,751,965 A | 5/1998 | Mayo et al. |
| 5,786,803 A | 7/1998 | Hernandez et al. |
| 5,806,081 A | 9/1998 | Swen et al. |
| 5,809,165 A | 9/1998 | Massen |
| 5,812,286 A | 9/1998 | Lin |
| 5,821,917 A | 10/1998 | Cappels |
| 5,828,793 A | 10/1998 | Mann |
| 5,835,817 A | 11/1998 | Bullock et al. |
| 5,850,472 A | 12/1998 | Alston et al. |
| 5,859,711 A | 1/1999 | Barry et al. |
| 5,867,603 A | 2/1999 | Barnsley et al. |
| 5,940,186 A | 8/1999 | Barry et al. |
| 5,978,745 A | 11/1999 | Devine |
| 6,018,361 A | 1/2000 | Fujii et al. |
| 6,035,103 A | 3/2000 | Zuber |
| 6,043,909 A | 3/2000 | Holub |
| 6,072,546 A | 6/2000 | Nakayabu |
| 6,097,471 A | 8/2000 | Buhr et al. |
| 6,157,735 A | 12/2000 | Holub |
| 6,219,155 B1 | 4/2001 | Zuber |
| 6,232,954 B1 | 5/2001 | Rozzi |
| 6,246,790 B1 | 6/2001 | Huang et al. |
| 6,271,937 B1 | 8/2001 | Zuber |
| 6,282,311 B1 | 8/2001 | McCarthy et al. |
| 6,282,312 B1 | 8/2001 | McCarthy et al. |
| 6,282,313 B1 | 8/2001 | McCarthy et al. |
| 6,285,784 B1 | 9/2001 | Spaulding et al. |
| 6,301,393 B1 | 10/2001 | Spaulding et al. |
| 6,310,626 B1 | 10/2001 | Walker et al. |
| 6,320,668 B1 | 11/2001 | Kim |
| 6,335,983 B1 | 1/2002 | McCarthy et al. |
| 6,337,922 B2 | 1/2002 | Kumada |
| 6,341,175 B1 | 1/2002 | Usami |
| 6,342,951 B1 | 1/2002 | Eschbach et al. |
| 6,369,901 B1 | 4/2002 | Buhr |
| 6,373,580 B1 | 4/2002 | Walker |
| 6,380,951 B1 | 4/2002 | Petchenkine et al. |
| 6,381,343 B1 | 4/2002 | Davis et al. |
| 6,388,674 B1 | 5/2002 | Ito et al. |
| 6,404,509 B1 | 6/2002 | Kuwata et al. |
| 6,414,690 B1 | 7/2002 | Balasubramanian et al. |
| 6,429,875 B1 | 8/2002 | Pettigrew et al. |
| 6,430,311 B1 | 8/2002 | Kumada |
| 6,430,312 B1 | 8/2002 | Huang et al. |
| 6,437,792 B1 | 8/2002 | Ito et al. |
| 6,459,425 B1 | 10/2002 | Holub et al. |
| 6,459,436 B1 | 10/2002 | Kumada et al. |
| 6,483,524 B1 | 11/2002 | Petchenkine et al. |
| 6,501,850 B2 | 12/2002 | Setchell |
| 6,504,950 B1 * | 1/2003 | Murashita et al. ........... 382/162 |
| 6,505,256 B1 | 1/2003 | York |
| 6,516,089 B1 | 2/2003 | McCann et al. |
| 6,522,778 B1 | 2/2003 | Tamagawa |
| 6,525,721 B1 | 2/2003 | Thomas et al. |
| 6,549,652 B1 | 4/2003 | Persiantsev et al. |
| 6,549,653 B1 | 4/2003 | Osawa et al. |
| 6,559,944 B1 | 5/2003 | Van Aken et al. |
| 6,580,524 B1 | 6/2003 | Weichmann et al. |
| 6,603,879 B2 | 8/2003 | Haikin et al. |
| 6,606,165 B1 | 8/2003 | Barry et al. |
| 6,611,249 B1 | 8/2003 | Evanicky et al. |
| 6,621,923 B1 | 9/2003 | Gennetten |
| 6,624,908 B1 | 9/2003 | Petchenkine et al. |
| 6,633,396 B1 | 10/2003 | Barry et al. |
| 6,636,326 B1 | 10/2003 | Zuber |
| 6,654,491 B1 | 11/2003 | Hidaka |
| 6,657,741 B1 | 12/2003 | Barry et al. |
| 6,704,442 B2 | 3/2004 | Haikin et al. |
| 6,748,471 B1 | 6/2004 | Keeney et al. |
| 6,757,450 B1 | 6/2004 | Gershony et al. |
| 6,788,305 B1 | 9/2004 | Ohga |
| 6,803,921 B1 | 10/2004 | Balasubramanian et al. |
| 6,867,883 B1 | 3/2005 | Cholewo et al. |
| 2002/0003903 A1 | 1/2002 | Engeldrum et al. |
| 2002/0085749 A1 | 7/2002 | Setchell |

FOREIGN PATENT DOCUMENTS

| | | |
|---|---|---|
| WO | WO 99/10866 | 3/1999 |

OTHER PUBLICATIONS

Ohno, Y. et al., Four-Color Matrix Method for Correction of Tristimulus Colorimeters—Part 2, Proc., IS&T Sixth Color Imaging Conference (1998).

Cowan, W., An Inexpensive Scheme for Calibration of a Colour Monitor in Terms of CIE Standard Coordinates, Computer Graphics, vol. 17, No. 3, pp. 315-321, Jul. 1983.

Blessing, R., Before Your Very Eyes, Publishing & Production Executive, Aug. 1995.

Adobe Photoshop Version 5.0, User Guide, Adobe Systems Incorporated, pp. 6 and 79-86, 1998.

Commission Internationale de L'Eclairage, "Colorimetry", Second Edition, Austria, Publication CIE 15.2, pp. 19-23, 27-32, (1986).

Designmaster 8000, Operator Training Manual, Kodak Electronic Printing Systems, pp. 1-7, 145-147, 301-315 and 361-362 (1990).

Cornsweet, T.N., Visual Perception, Academic Press, pp. 80-89 and 311-341 (1970).

Rose, H.E., Adaptation of Electronic Color Correction to the Printing Process, TAGA Proceedings, pp. 28-37 (1955).

Bartleson et al., Brightness Perception in Complex Fields, J. Opt. Soc. Amer., vol. 57: pp. 953-957 (1967).

Holub, R. et al., Color Systems Calibration for Graphic Arts: I. Input Devices, J. Imaging Technol., vol. 14, pp. 47-52.

Holub, R. et al., Color Systems Calibration for Graphic Arts: IL Output Devices, J. Imaging Technol., vol. 14, pp. 53-60, (1988).

Edmund Industrial Optics, Optics and Optical Instruments Catalogue, No. N007B, p. 266 (2000).

International Color Consortium, File Format for Color Profiles, Specification ICC.1:Sep. 1998 and Addendum 2 to Spec. ICC.1:Sep. 1998, under Document ICC.IA:Apr. 1999 (1999).

Marszalec, E. et al., Some Aspects of RGB Vision and its Applications in Industry, International Journal of Pattern Recognition and Artificial Intelligence, vol. 10, No. 1, pp. 55-72 (1996).

Marszalec, E. et al., On-Line Color Camera Calibration, IEEE, pp. 232-237 (1994).

Marszalec, E. et al., Color Measurements Based on a Color Camera, Proc. SPIE/NEW vol. 3101, Image Processing Techniques and Applications: Algorithms, Methods and Components II, Munich, 170-181 (1997).

Brown, S. W. et al., NIST Calibration Facility for Display Colorimeters, Proc., IS&T/SPIE 11th International Symposium, Electronic Imaging'99, San Jose (1999).

Brown, S. W. et al., Calibrating Colorimeters for Display Measurements, Article Manuscript: Information Display Dec. 1999 pp. 30-34 (1999).

Buckley, R., Specifying Color in Office Documents, TAGA Proceedings, pp. 30-43 (1990).

Masia, A., A Digital Color Separating System Based on Principles of Colorimetry, TAGA Proceedings, pp. 346-361 (1984).

Newman, T., Improved Color for the World Wide Web: A Case Study in Color Management for Distributed Digital Media, TAGA Proceedings, vol. 2, pp. 772-787 (1995).

Micrografx Picture Publisher Reference Guide, Micrografx, Inc., 1992.

Radius PressView System User's Manual, Jun. 1995.

Radius PressView 17SR and PressView 21SR User's Manual, Mar. 1995.

Radius ProSense Display Calibrator User's Manual, Jun. 1995.

Office Action dated Feb. 10, 2009 with Notice of References Cited for U.S. App. No. 11/216,784, filed Aug. 31, 2005.

Pointer, M., The Gamut of Real Surface Colours, Color Research and Applications, vol. 5, No. 3, pp. 145-155, 1980.

Hunt, R., A Model of Colour Vision for Predicting Colour Appearance in Various Viewing Conditions, Color Research and Application, vol. 12, No. 6, pp. 297-314, 1987.

Silicon Graphics, Inc., SGI Multilink Adapter Box for the Flat Panel Monitor, Owner's Guide, 1999.

Berns, R. et al., CRT Colorimetry. Part I: Theory and Practice, Color Research & Application, 18(5): pp. 299-314, 1993.

Berns, R. et al., CRT Colorimetry. Part II: Metrology, Color Research & Application, 18(5): pp. 315-325, 1993.

Imation Verifi Accurate Web Color: Technology White Paper, 2000.

Johnson, T., An Effective Color Management Architecture for Graphic Arts, TAGA Proceedings, published by the Technical Association of the Graphic Arts, now part of PIA/GATF, Pittsburgh, PA, pp. 88-111, 2000.

Gaido, D. et al., Remote Press Proof System, U.S. Appl. No. 60/195,688, filed Apr. 7, 2000.

* cited by examiner

METHODS AND APPARATUS FOR CALIBRATING A COLOR DISPLAY

This is a divisional of U.S. patent application Ser. No. 09/832,553, filed Apr. 11, 2001, now U.S. Patent No. 7,102, 648, which claims the benefit of U.S. Provisional Patent Application Ser. No. 60/195,837, filed Apr. 11, 2000, which is herein incorporated by reference.

FIELD OF THE INVENTION

The present invention on relates to methods for color display calibration which is especially useful in a network for assuring consistency of color reproduction of multiple color devices. The invention further relates to an apparatus for calibrating a sensor which may be used for measuring color of a color display in calibration of the display. The invention is related to U.S. Pat. No. 6,043,909 and U.S. patent application Ser. No. 09/139,498, filed Aug. 25, 1998, now U.S. Pat. No. 6,459,425.

BACKGROUND OF THE INVENTION

The calibration of color displays, such as cathode ray tube (CRT) displays, has conventionally been provided by software in the personal computer coupled to the display for enabling a user to manually modify characteristics of color displays, or select predefined color transformation curves. Often, such calibration is a part of typical Desktop Publishing Software. Calibration may be improved by the use of a sensor for measuring color from a display, which can then enable automatic calibration with or without user intervention. An example of an automatic calibration system is shown in FIG. 1. FIG. 1 shows a video display 10 with cowel 11 and sensor 12 as generally described in U.S. Pat. No. 6,043,909 and U.S. patent application Ser. No. 09/139,498, integrated with a host computer's graphics display section 14 and a display controller for controlling display 10 function (e.g., brightness, contrast). Sensor 12 is called "lumeter" in application Ser. No. 09/139,498. Display 10 is shown in cross section as viewed from the side. An upper, heavy black line may represent a mounting arm coupled to the display which supports a sensor and may support a cowel. The cowel helps to shield the screen 13 of the display from ambient illumination and the sensor enables highly automatic (and even unattended) calibration. A circumferential cowel provides a "black trap" or surface which prevents any light from reflecting specularly off the screen of the monitor and into the sensor housing—in other words, the lower flange of the cowel provides better shielding from stray light and ensures that the sensor sees only light which is diffusely reflected from the screen. The latter is important to automatic measurement.

Many high performance displays have embedded microprocessors 15 which provides a digital controller for controlling the functions of the display. For example, it is possible to modify the gains in the R, G and B channels by sending signals from the host computer to the processor in the display. In some situations, the sensor 12 communicates directly with the display's processor, rather than, or in addition to, a host computer.

In displays which employ cathode ray tubes (CRTs) the gains in the R, G and B channels affect the voltages on the electron guns and thence the amount of light emitted by phosphors in response to electron bombardment. By adjusting analog gains and offsets, one can exert control over the tone reproduction and neutral balance of the display. When this method of control is available, it is preferred, but it requires knowledge of the control codes, which vary from one make of display monitor to another. The system of FIG. 1 may be adapted to interact with analogous controls in newer "digital displays."

The operation of Graphics Display Section (software and hardware) of the host computer is illustrated in block 14. Device-independent color image data are fetched from RAM in the host computer and introduced to the graphics display section. The next two steps, namely 1) conversion in a 3×3 matrix (which handles the color mixture problem) and 2) processing of R, G and B data each through its own Look Up Table (LUT) can be combined in a color translator (which may be in International Color Consortium (ICC) or other standard format) for the video display. Channel-separate LUTs can be positioned both before and after the mixing matrix, as detailed in related U.S. Pat. No. 6,043,909 and U.S. patent application Ser. No. 09/139,498. The LUTs may provide a means of influencing neutral balance and tone reproduction. White-balance or neutral-balance is an adjustment to the display system that maps a neutral color represented by numbers in the computer, to a particular displayed color. In other words, it adjusts the balance between red, green and blue channels of the physical display in order to realize color coordinates of a particular, perceived white. Tone reproduction curves (TRC's) define the orderly progression of relative lightness values for the points in an image. Differently shaped curves mean that neighboring image points will be more or less similar in lightness. Tone reproduction is closely related to a property of displays known as gamma.

Processed data are stored in video RAM and are scanned repeatedly for transfer to the display. The LUTs and the DACs (Digital to Analog Converters) often limit the quality of the system. LUTs are often 8-bits in and 8-bits out, providing resolution that may not be acceptable in some applications. Therefore, although modifications to neutral balance and Tone Reproduction Curves (TRCs) can be effected in the LUTs, it is preferable to make most of the changes in the gains and offsets of the display's RGB channels, if possible, and to reserve the LUTs for "fine tuning."

A generalized node of a Virtual Proofing network as described in U.S. Pat. No. 6,043,909 and U.S. patent application Ser. No. 09/139,498 is shown in FIG. 2. A nodal computer 20 receives calibration data (preferably in device independent coordinates which are preferably based on the Standard Observer) from (a) device(s) 22 which can measure a video display 21 and hard copy 23. (One device may be capable of all the necessary measurements or more specialized devices may handle different tasks.) The computer 20 processes the data and 1) modifies shared constituents of the Virtual Proof to be communicated through the network link 25 to other nodes, and 2) exercises appropriate control over the rendering devices (21 and 23) at the node.

Visual calibration may be performed for a display. For example, in U.S. Pat. No. 5,638,117, a card or reflector is used in visual calibration of a display. The card is used as a calibration reference by the user with respect to images displayed on the display to enable visual calibration. However, such calibration is not provided for as part of a virtual proof to enable other color devices in a network, which may be remote from each other, to render the same color.

Further, other approaches to assuring calibration of displays provides for locking display controls. For example, a "Color Sentry" feature for locking controls is described in U.S. Pat. No. 5,739,809. However, locking controls do not provide the capability for insuring that the controls are properly set for linear operation of the display.

SUMMARY OF THE INVENTION

It is the principal object of the present invention to provide improved methods for calibrating a display to assure that color is consistent between calibrations of the same display and/or between color reproduced by different color displays or rendering devices, such as printers or proofers, which may be in a network.

It is another object of the present invention to provide improved methods by which two display monitors may be placed into a desirable state of tone reproduction by maximizing contrast and setting brightness, such as to 50 or 60%, while insuring that superposition applies.

Briefly described, the method includes providing a color display (or monitor) coupled to a computer system, displaying one or more screens on the display, and adjusting the brightness and contrast of the display to set one or more of white balance, gamma and tone, which accounts for the influence of ambient illumination on color reproduction of display and provides superposition of color of the display.

The color display may have brightness and contrast controls and receive signals from a host computer in a plurality of color channels, such that the method may further include increasing the contrast of the display to about a maximum level for the display, increasing the brightness of the display to about a maximum level for the display, lowering the brightness of the display until superposition of colors is observed, measuring at least the neutral balance and tone reproduction of the display, and adjusting the balance and tone to match desired values.

At least one sensor may be directed toward the display for providing color measurement of the display to the computer system. The present invention further provides a system for calibrating such a sensor having one or more channels which is useful for calibrating display surfaces. The system includes one of a self-luminous-display or a reflective surface, a measurement sensor and a reference sensor each directed toward one or more display surfaces, a computer system coupled to the display, and a monochromator for illuminating the reflector with light of certain color in which the color of the light is controllable by the computer system and the measurement and reference sensors are capable of measuring the color of the reflector when illuminated by the monochromator to calibrate the measurement sensor in accordance with the measurements taken by both the measurement sensor and the reference sensor.

A method of calibrating color devices associated in a network is further provided having the steps of adjusting one or more devices to match one or more reference images, measuring adjusted calibration parameters of the devices, and storing the calibration parameters for use in calibrating color devices in the network to reproduce substantially the same colors within the capabilities of said devices.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Terms used below are described in U.S. Pat. No. 6,043,909 and U.S. patent application Ser. No. 09/139,498, filed Aug. 25, 1998, which are herein incorporated by reference. The methods described herein for display calibration may be performed using the common display configuration of FIG. 1 with a host computer. The color display or monitor may optionally have a digital controller interfaced with the host computer in addition to the driving signals outputted to the color display. However, any other computer controlled color display may be used with these methods with or without the sensor and cowel assembly coupled to the display, or the computer being networked as shown in FIG. 2.

The color sensor may be taught a subjectively preferred neutral balance with the aid of the user of the computer coupled to the display. The incorporated patent and application describe the color sensor as a spectral one or a colorimeter ("SOM" or means to simulate the Standard Observer) or a single channel sensor ("lumeter") which sets and maintains white balance and tone reproduction. Many technologies and particular products are available that can perform the aforementioned functions.

Although accurate calibration of sensors is essential to reliable network color, practical applications may arise in which an operator uses a calibrated sensor to measure a white balance established subjectively, so that the information can be shared in Virtual Proofing as described in the incorporated patent and application. For example, a "standard" reflection viewing hood for color appraisal of hard copy may exist at a node in the network. The word "standard" was put in quotes because the deviation of a viewer from its nominal value (e.g. "D50" or Daylight 5000, a standard white value for viewing printed copy) is often quite noticeable. Non-standard white points constitute a motivation for subjective adjustment of white balance on a display or other medium. A viewing hood was described in U.S. patent application Ser. No. 09/139,498.

Figure 3:
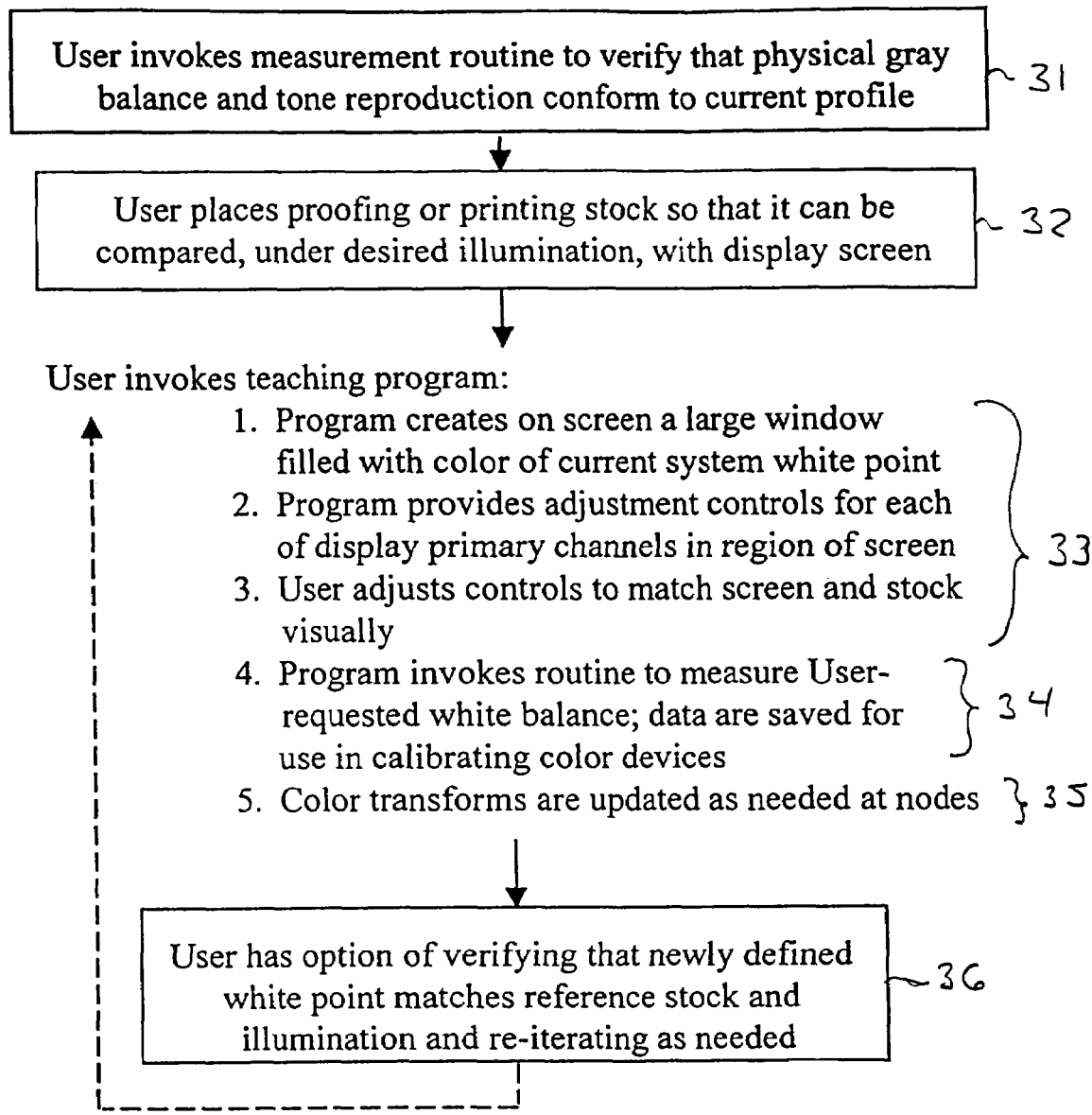
FIG. 3 is a flow diagram of a method by which the sensor of FIG. 1 used for automatic maintenance of calibration is "taught" a white balance adjustment determined subjectively by the user and by which the preferred white balance can be communicated to other nodes in the network.

It may be desirable to set the white points of displays in the network to the color of paper stock under the illumination provided by the viewing hood. The Users may lack the means to measure paper white instrumentally or may prefer to rely on a subjective judgment of match. Accordingly, it is one feature of the present invention to provide a User at a node with a viewing hood that provides "standard illumination of reflection copy. User may use a software tool such as Photoshop (Trademark of Adobe Systems) to match the display white to the paper white and invoke a routine in which a sensor measures the balance of primary channels set by the User. This white point information can then be communicated to other nodes through the Virtual Proof and used to modify profiles at the various nodal displays to conform. Use of the information to modify profiles is well known in the art, but will be clarified further in the section entitled "Color Calibration of Displays." A flow diagram of the method is shown as FIG. 3.

First, the User has the option of verifying that the neutral balance and tone reproduction of the physical monitor are consistent with those assumed by the profile-generating software (step 31). User invokes measurement routine to verify that physical gray balance and tone reproduction conform to current profile. For a conventional, three-primary system, there is a relation between neutral balance and the balance of physical activation in the three channels, as described in the next section. The purpose of verifying white balance is to make sure that the display is at a known starting point if the state of calibration of the display has not been checked recently.

The User is instructed to make sure that the reference paper (or other substrate) stock is positioned under the reference illuminator so that comparisons of its color with the display white can be made easily (step 32). User places proofing or printing stock so that it can be compared, under desired illumination, with display screen. Then the software permits the User to modify the white balance at highlight in such a way as to match screen white with the reference (step 33). This may be provided by the user invoking (or executing) a teaching program on the computer coupled to the display which creates on the screen of the display a large window filled with the color of the current system's white point, provides adjustment controls for each of the displays primary channels in a region on the screen, and allows the user to adjust the controls to match screen and the stock visually. Then, the balance of primary channels chosen to match the reference is measured by the sensor 12 coupled to display 10 (step 34) and a white point is computed for sharing by means of the Virtual Proof (defined in incorporated patent and application) so that color translation profiles for the color devices of the nodes of the network may be revised in accord with the new white (step 35). In this way, the sensor and system are "taught", and may retain, the User's subjective preference. User has the option of verifying that the newly defined white point matches the reference stock and illumination, and reiterating steps 33-35, if needed (step 36).

The foregoing discussion has been in terms of matching a video display to an illuminated white paper. However, colors other than white and devices and media other than video displays and paper, may also be matched in the same manner. For example, information regarding how to match a paper substrate color to a textile's off white color could be prepared for incorporation in a Virtual Proof with reference to this and the other applications cited above.

In the ordinary operation described in incorporated patent and application, the sensor measures the balance of activity in the primary channels, computes the white point, compares the white point to a standard value or to that assumed by the image processing computers of the network and then determines the re-balancing necessary to bring the physical display into conformance. The re-balancing may be implemented by changes to offsets and gains in the analog section of the display controls and/or modifications to LUTs in the graphics control circuitry of the host computer.

For some users and applications, a variation of the foregoing scheme, in which complex images are matched rather than homogeneous fields, may be desirable. In this case, there are two ways of utilizing the match data. In one, the sensor measures white point and tone reproduction curves of the monitor after matching and records them, or correction functions based upon them, in the Virtual Proof. In the other, the sensor is used to ensure that the system is in calibration (white point and tone reproduction at least—possibly chromaticities, too.) Then, the User employs color editing tools (gray balance, tonal correction, selective color, etc.) and the corrections are recorded in the color-to-color' table of the Virtual Proof and shared. Color-to-color' tables are disclosed in the above incorporated patent.

One should consider the following factors for successful monitor color calibration of a display, which may be useful for Internet or other networked applications:

1) knowledge of a linear color-mixture matrix for a set of three, additive light primaries such as are found in today's video display technologies (four or more primaries are considered in other, related applications,)
2) set up of the display with regard to properties such as "brightness" and "contrast," so that it truly operates as a linear, additive device,
3) ability to set neutral balance of the physical display to conform closely to information used to make color translation profiles
4) ability to set tone reproduction (gamma) of the physical display to conform to what is assumed by the application software, encoded in the image data and or represented in components of the color translation profiles and 5) means of measuring and computing the effects of factors such as ambient illumination or maximum attainable highlight luminance on device gamuts and of communicating such information among different nodes in a network and of modifying device profiles in order to compensate and ensure the best possible match at different sites.

Illustrative data from real monitors are shown below in Table One, which may provide a basis for calibration methods described herein. First, the emission of light by excited phosphor molecules under electron bombardment is a stereotypical process. The spectral emission functions of Red, Green and Blue channels in two monitors of the same make are believed to be nearly identical. For example, one monitor was used extensively over 4.5 years and the other monitor has had very limited use over the last 1.5 years. I will refer to these two monitors as Type I, one "older" and the other "newer" in subsequent data presentation. For either monitor of Type I, the spectral emission characteristics do not change appreciably in repeated measurements over extended periods of time. Data from a third monitor of different make ("Type II" herein) are also considered.

Although the examples considered here are based on cathode ray tube technology, the methods and instrumentation apply to any video display technology. In the event that the chromaticities of the color channels of a liquid crystal display, for example, are not constant with time, then instrumental means similar to those described in incorporated patent and application should be used to re-measure the chromaticities at the required intervals, unless, of course, the change is predictable to within an acceptable tolerance. In the latter case, a suitable correction function, known to the controlling system, can be applied. Also, a simple instrument is disclosed in a subsequent section of this application which applies to situations in which spectral changes (that cause the apparent chromaticity shifts) are stereotyped in nature, but may not occur at predictable times.

Key results of Table One, as they apply to factors 1 through 4 of the calibration problem, will be abstracted following definition of the following terms: Gamma is the slope of the function relating log light intensity to log applied voltage. Dynamic Range refers to the ratio of maximum to minimum luminance emitted by the display in a given operating condition. Max(imum) Luminance is the brightest displayable tonal value, or highlight.

Color Mixture should be considered in which the term "chromaticity" used below refers to a color property based on the Standard Observer. The color mixture problem can be summarized by the following equation:

$$\begin{pmatrix} x_r & x_g & x_b \\ y_r & y_g & y_b \\ z_r & z_g & z_b \end{pmatrix} \cdot \begin{pmatrix} b_0 \\ b_1 \\ b_2 \end{pmatrix} = \begin{pmatrix} x_w \\ y_w \\ z_w \end{pmatrix}$$

$x, y, z$ chromaticities in color-mixture matrix / balance vector / White Point vector At the left is a matrix of chromaticities, x's, y's and z's which summarize the color mixture properties of the Red, Green and Blue (indicated by subscripts r, g, b) channels of the display in relative terms. Chromaticities depend on the spectral emission properties of the primary channels.

To setup the display for linear operation, display controls may be used. Brightness and contrast are two controls available to Users on almost all displays. The icon for the brightness control is often a shining sun while that for Contrast is often a split circle. On the Type II monitor, the controls are available as two knobs that provide continuous adjustment. On the older Type I monitor, the controls are typically available as positive and negative, digital push-buttons—i.e., digital means that continuous control is not available. On the newer Type I monitor, software exists to make the controls visible and operable on the display through a graphical user interface featuring slide bar adjustments.

The brightness and contrast controls influence the offsets and gains in the analog section of a CRT display and determine whether the display is operated within its linear range. The two controls adjust how dark the screen is when the host computer sends zero signals to R, G and B channels as well as the maximum brightness realized when R, G and B are full-scale. The host computer, such as a personal computer, can be coupled to each monitor to output images on the monitor.

White balance refers to the vector-inner-product of the color mixture matrix (see preceding equation) and the balance vector which yields the white point. Many white points are available, depending upon the balance among the three color channels R, G, B. In the software system, one of those white points can be picked which associates with a particular vector of balance factors (b's.) An important aspect of good calibration is to make sure that the channels of the physical monitor are balanced consistently with what the software expects. Mentioned earlier, in the previous section, the offset and gain controls of the display and/or graphic LUTs can be modified to that end.

Even when the color mixture properties of a display are invariant, the efficiency of the channels may change with time. Cathode Ray Tubes exhibit "phosphor fatigue" in which the ability to produce light in response to electron bombardment declines over time. Fatigue may occur differently in the different channels. U.S. Pat. No. 5,821,917 (and U.S. Pat. Nos. 5,512,961, 5,561,459 and 5,978,745) discloses internal monitoring of beam current and adjustment of same over time to compensate for the loss of efficiency.

For gamma and tone reproduction on a color display, typically gamma is treated as a constant by imaging applications. However, it seldom is constant, usually tending to increase in value as the voltage to the electron guns decreases, i.e., at lower light levels. For this reason, there are three rows of gamma values for each monitor in Table One. The first is called "slope 255 to 223." What this means is that the log of light output for a digital signal from the host computer of 255 (the 8-bit maximum) minus the log of light output for a drive of 223 is divided by log 255 minus log 223 and so on. The column headings represent different settings of the brightness control. For each monitor, contrast was set to the maximum or very near the maximum. Then the brightness was adjusted to 20%, 40%, etc. of maximum. Generally, the numbers correspond to the luminance of the green channel measured at that brightness setting as a percent of the maximum green luminance at the full scale setting.

TABLE ONE

|  | 20% Bri | 40% Bri | 50% Bri | 60% Bri | 80% Bri | 100% Bri |
|---|---|---|---|---|---|---|
| *Newer Type I* | | | | | | |
| slope 255 to 223 | 2.78 | 2.50 | | 2.25 | 2.04 | 1.85 |
| slope 255 to 159 | 3.05 | 2.65 | | 2.33 | 2.07 | 1.83 |
| slope 255 to 31 | | | | 2.69 | | |
| PR 700 Lum, 255 Green | 21.98 | 28.17 | | 35.66 | 44.43 | 54.34 |
| PR 700 Lum, 255 White | 35.92 | 45.33 | 50.34 | 56.49 | 69.57 | 81.92 |
| Dynamic Range | >6K:1 | >7.5K:1 | | 10K:1 | ~500:1 | ~60:1 |
| *Type II* | | | | | | |
| slope 255 to 223 | 3.88 | 2.77 | 2.45 | 2.27 | 1.95 | 1.70 |
| slope 255 to 159 | 4.66 | 2.97 | 2.53 | 2.31 | 1.92 | 1.64 |
| slope 255 to 31 | | 4.43 | 3.13 | 2.35 | | |
| PR 700 Lum, 255 Green | 14.12 | 27.89 | 36.71 | 42.92 | 57.71 | 72.57 |
| PR 700 Lum, 255 White | 19.88 | 38.29 | 48.23 | 50.04 | 52.19 | 53.33 |
| Dynamic Range | >6K:1 | >11K:1 | 7.5K:1 | ~550:1 | ~35:1 | ~13:1 |
| *Older Type I* | | | | | | |
| slope 255 to 223 | unavail., | 2.48 | | 2.26 | 2.01 | 1.81 |
| slope 255 to 159 | beyond | 2.64 | | 2.40 | 1.92 | 1.71 |
| slope 255 to 31 | adjust. | | | 2.54 | | |
| PR 700 Lum, 255 Green | limit | 22.35 | | 27.20 | 37.84 | 45.25 |
| PR 700 Lum, 255 White | | | | 42.39 | | 67.78 |
| Dynamic Range | | | Suitable data not available | | | |

Below the rows of slopes in the table are measurements (made with a PhotoResearch PR 700 spectroradiometer) of Luminance (Y) for Green channel only and then for all three channels together ("white".) In each case the luminance measurement was made at full scale, i.e., either G=255 or R=G=B=255. The last row contains the ratio of the reading (by the simple sensor, the "Lumeter" detailed in application Ser. No. 09/139,498) at 255 (for green) to the reading where all channels were receiving a digital drive of 0. It is called dynamic range because it expresses the range of tonal values that can be displayed under the given operating conditions. Where a measurement was not or could not be made, the cell is empty.

Using Table One, the following observations may be made.
1. Old and newer Type I monitors behave almost identically, except for the reduction in maximum luminance of the older display to about 80% of those of the newer. This is probably the result of "phosphor fatigue" alluded to already.
2. Large dynamic range and high max Luminance are desirable. The best compromise for achieving these, along with approximately constant gamma, occurs at about 60% Brightness (50% for Type II.) At this brightness, the gammas of all three monitors are very similar and the increases in gamma at lower luminances are similarly small.
3. The Type II monitor (a less expensive, lower performance device) suffers a failure of superposition at brightnesses exceeding about 50%. Superposition is a condition of linearity (an essential property for additive color mixture) which is satisfied when the sum of the luminance of Red, Green and Blue channels measured individually equals the luminance of White (all three channels on together.) Superposition failure is apparent from the fact that white luminance barely increases at all at higher brightness settings, even though green luminance increases steadily.

The foregoing results support the conclusion that any two monitors may be placed into a desirable state of tone reproduction by maximizing contrast and setting brightness to 50 or 60%, while insuring that superposition applies. Where an interface between host computer and monitor exists and the codes needed to control things like offsets and gains are known, the settings can be made automatically. In a subsequent section, a method is described by which Users can make the settings on devices such as the Type II device. Also subsequently, methods will be disclosed for measuring and dealing with luminance reductions due to fatigue, such as using Contrast.

Viewing conditions should also be considered. The difference in maximum luminance between the two Type I monitors (practically identical in other respects) would probably show up as a visible difference in color reproduction if the two monitors were perfectly calibrated and set up side-by-side. An example of where this could matter is in home viewing of a garment of saturated hue at a clothier's World Wide Web site. Apparent saturation varies with luminance level and could influence a buy/return decision. Strictly speaking, phosphor fatigue (and attendant decrease in max luminance) has nothing to do with viewing conditions, but can be one factor which influences perceived color much as does ambient illumination. It also exemplifies a situation in which knowledge of the absolute value of a parameter such as max Luminance can be included in Virtual Proof data and used to improve the extent of match achievable between two or more sites.

If two monitors were put side-by-side, displaying matching images, and then the amount of backlight reflecting off the screen of one of the monitors were somehow increased, the images would no longer match. The reflected light adds with that emitted by the monitor, decreasing the dynamic range and the saturation of colors.

As is explained in the incorporated patent application, a Lumeter can automatically sense the level of ambient backlight, although it cannot distinguish its color temperature. Methods are described herein for estimating the amount of the ambient backlight and its affect on color balance, based on human threshold detection or on instrumental measurements. Methods are also described for estimating the gamma function as well as the absolute levels of light emitted at various contrast or brightness settings or for different digital signals from the host computer. A simple User-Interface is provided below.

Visual calibration may be performed for a display with the assistance of a user using a calibration reference. The methods described herein provide for a more complete calibration than described in U.S. Pat. No. 5,638,117, and such calibration is useful in providing data for networking using the Virtual Proof as well as stand-alone operation of the display. Visual calibration is described in connection with FIGS. 4-10.

A step-wise approach to visual calibration is presented which permits the estimation of parameters, which can be used as constituents of the Virtual Proof without any hardware assist. One of these parameters is the absolute luminance of highlight white on a video display. Differences in the absolute luminance prevailing on two video displays can give rise to differences in the appearance of imagery on two monitors. The differences could detract from Virtual Proofing.

The use of "visual" calibration techniques in the estimation of Virtual Proof parameters is covered in U.S. Pat. No. 6,043,909, which recommends the use of a "standard observer meter" or SOM. As is explained in the earlier application, a SOM may be an electronic instrument designed to simulate the color matching behavior of the Standard Observer. The Standard Observer represents the average human with normal color vision. In this application, a particular method is detailed for insuring that a human performing "visual" calibration provides reliable, objective data. Note that visual calibration, by definition, is not automatic. While it may be more laborious, compared to instrumental methods, and possibly more prone to error, the methods are less expensive and available to a broader base of Users.

Figure 4:
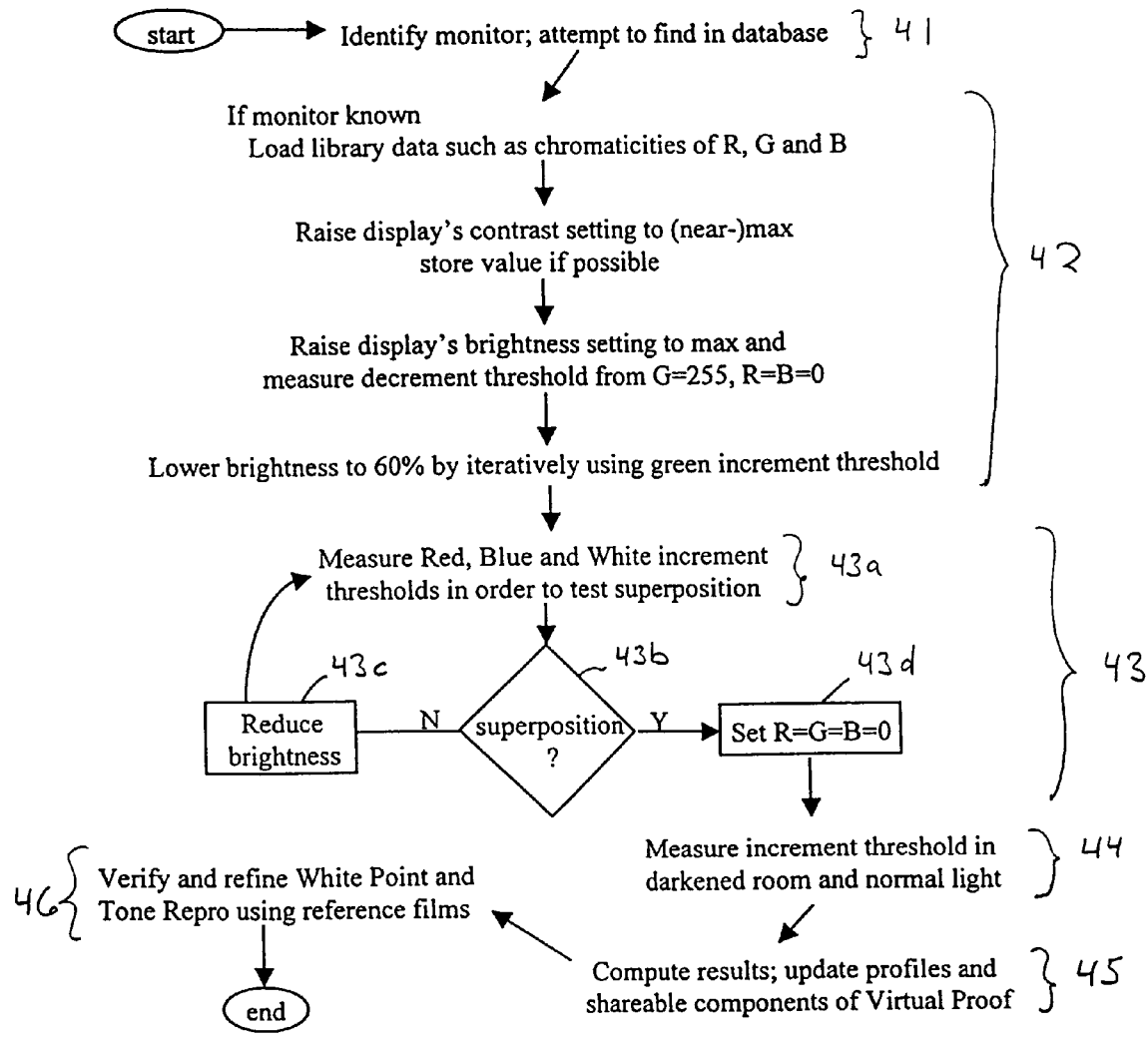
FIG. 4 is a flow diagram of a process for setting up (initializing or resetting brightness and contrast for linear color mixture) and measuring/adjusting white balance and tone reproduction of the display of FIG. 1 in the absence of any automatic sensor, i.e., by subjective, visual judgments of the user based on threshold techniques.

Referring to FIG. 4, the method for enabling visual calibration of a color display is shown using thresholds. This method is carried out with the assistance of the user interacting with a software application operating on the computer or via the Internet on the computer. First, identifying information about the display-to-be-calibrated is gathered such as locating information about the monitor in a database (step 41). At step 42, contrast and brightness (such as controls of the display) are adjusted so as to insure that the display is operated in the range in which linear color mixture applies. Increment or decrement threshold techniques are employed to adjust brightness in the absence of automatic sensing device. For example, if the monitor is known, library data is loaded from the database, such as chromaticities of R, G and B. The display's contrast setting is raised to nearly maximum value. Then, raise display's brightness setting to max and measure decrement threshold from G=255, R=B=O , and lower brightness to 60% by iteratively using green increment threshold. At step 43, data from red, blue and white increment threshold tests are combined with the green data to test whether the display is in the linear range (for color mixture— see earlier discussion.) If not, brightness is lowered in modest steps until linearity is realized. In other words, red, blue and white increment thresholds are measured in order to test superposition (step 43*a*). If at that brightness superposition is not present (step 43*b*), brightness is reduced (step 43*c*), until superposition is achieved and R, G, and B are all then reset to zero (step 43*d*). At step 44, threshold measurements are taken by measuring increment threshold in darkened room and normal light. The threshold measurements provide data useable in step 45 to adjust neutral balance at low display light levels and to compensate for, or alert the User to, the effects of ambient illumination conditions. At step 45, the threshold measurements are completed, and a profile for the color calibration is updated, and in the case of a Virtual Proof, the shareable components of Virtual Proof are updated. The user may optionally verify and refine White Point and Tone Reproduction using reference films (step 46). The steps of FIG. 4 are described in more detail below in which visual calibration is facilitated by the use of screens (FIGS. 5-8, 10) provided on the display by the software (application program) operating on the host computer coupled to the display, or provided to the computer via an Internet connection from a web server. For example, the software could be created by a Java applet, downloaded over the Internet to run in a browser, or it could be a stand-alone application. The host computer would have Internet connectability through a modem, or other network interface means, such as a leased line, and the like. Further, FIGS. 9A-9B further describe the process of the software using the screens of FIGS. 7 and 8.

Figure 1:
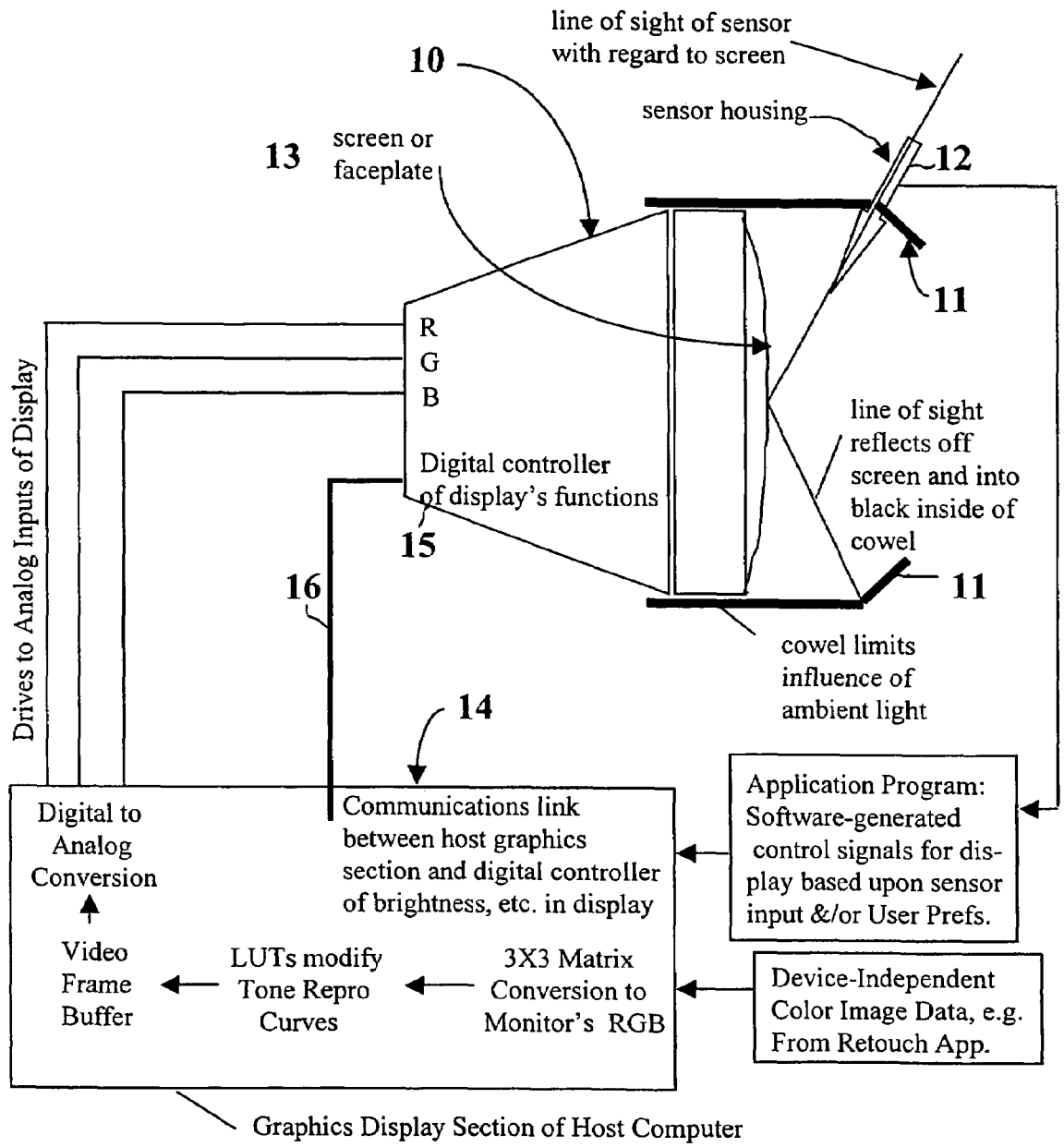
FIG. 1 is a schematic diagram of a display system showing a color display of a host computer which has a conventional computer graphics driver to output images from memory to the color display having a sensor and control for color measurements described in U.S. Pat. No. 6,043,909 and U.S. patent application Ser. No. 09/139,498.
Figure 2:
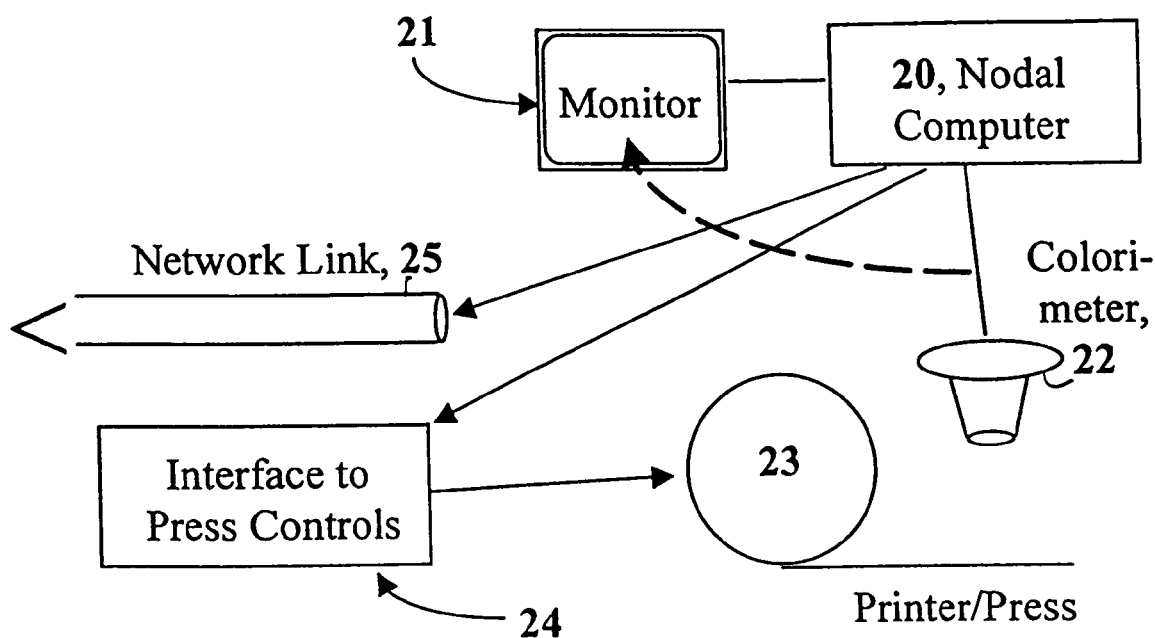
FIG. 2 is a block diagram of a single node of a virtual proofing network described in U.S. Pat. No. 6,043,909 to enable color on different color devices to appear the same, in which the monitor, nodal computer and colorimeters may represent the display, host computer and sensor of FIG. 1.

The procedure of FIG. 4 is applicable with an automatic sensor, such as shown in FIG. 1. The sensor, rather than the user observing the screen to detect when superposition is present, is used to detect display output at max brightness (and an established, nearly maximal value of contrast) and then reduce the brightness iteratively until readings from the sensor indicate that the system is observing superposition. For example, a sensor may be used when a new display is initially placed in service or when automatic sensing suggests that brightness and contrast controls have been tampered with.

Figure 5:
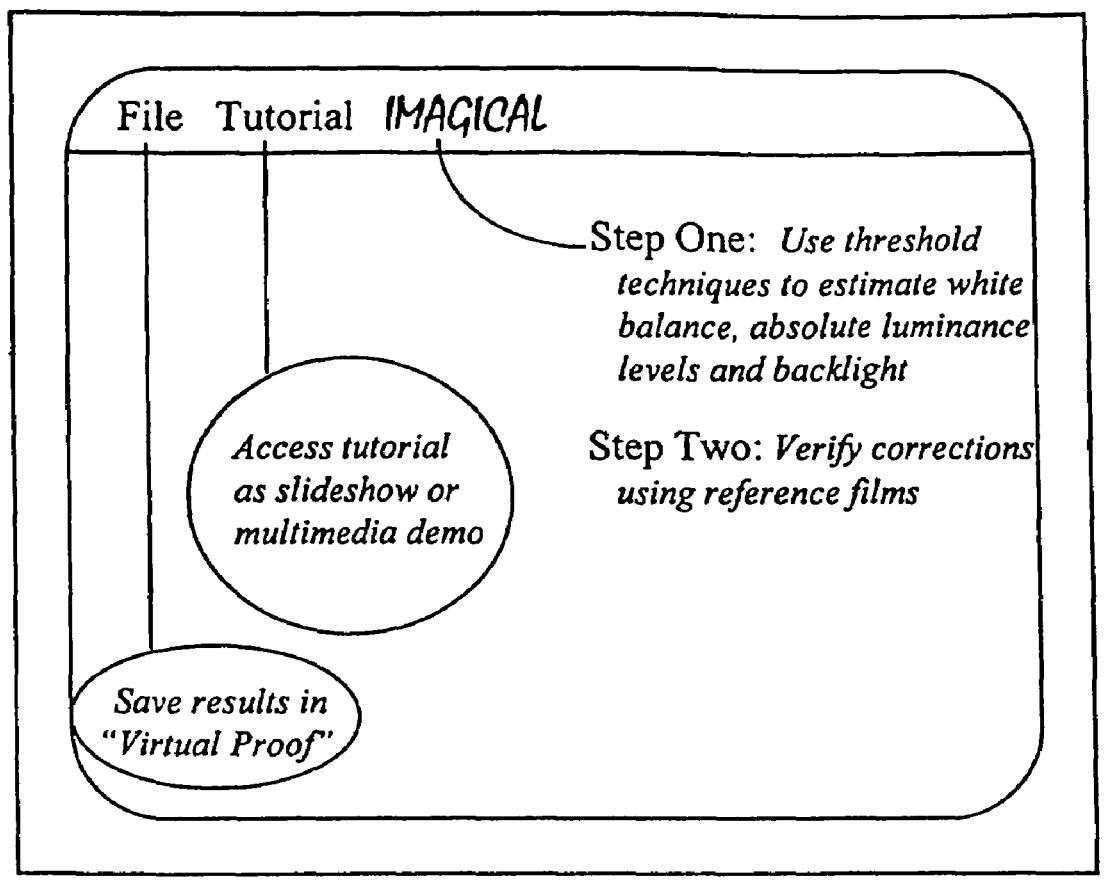
FIG. 5 is a top level menu screen of a user interface of a software application operating on the computer of FIG. 1 to enable collection of normative data for subjective calibration by a user which may be used to enable the user to calibrate the display of FIG. 1 visually for carrying out the method of FIG. 4.

FIG. 5 illustrates a opening (top menu) screen provided to the user. Step One consists of an array of threshold discrimination tasks designed to measure critical parameters without reliance on instruments or reference transparencies as generally described at steps 41-44 in FIG. 4. Step Two presents step 46 of FIG. 4 and involves a color-matching exercise which employs one or more colored transparency films in an effort to verify and refine the white point setting from step one, and a gradation-like function employing a reference film step wedge for the purpose of verifying and refining tone reproduction curves.

Weber's Law of human visual perception holds that $\Delta I/I$ is a constant. In other words, when a human just barely detects a light signal against a light background, the amount of incremental light needed is proportional to the amount of light in the background. Of course, it is also possible to measure a decrement threshold—the amount of decrease in light level which is just detectable. Call this quantity $\Delta^- R$ in the case of the Red channel of the display. A decrement is the only direction we can go when R or G or B is set to 255 digital, or whatever the maximum is. In this description, $\Delta R$ will have the same meaning as $\Delta^+ R$, for increment threshold. An increment is the only option when R=G=B=0 and we are trying to measure the amount of intrinsic emission from the tube in the absence of digital input (in a darkened room) or to measure the effects of ambient illumination reflecting off the screen and adding to the light emitted by the tube.

The method described herein employs normative data as the basis for translating a User's threshold discrimination into an absolute physical luminance. Normal color vision is essential. In general, a simple screening for color blindness may be desirable. Preferably, it is administered using the video display.

Figure 6:
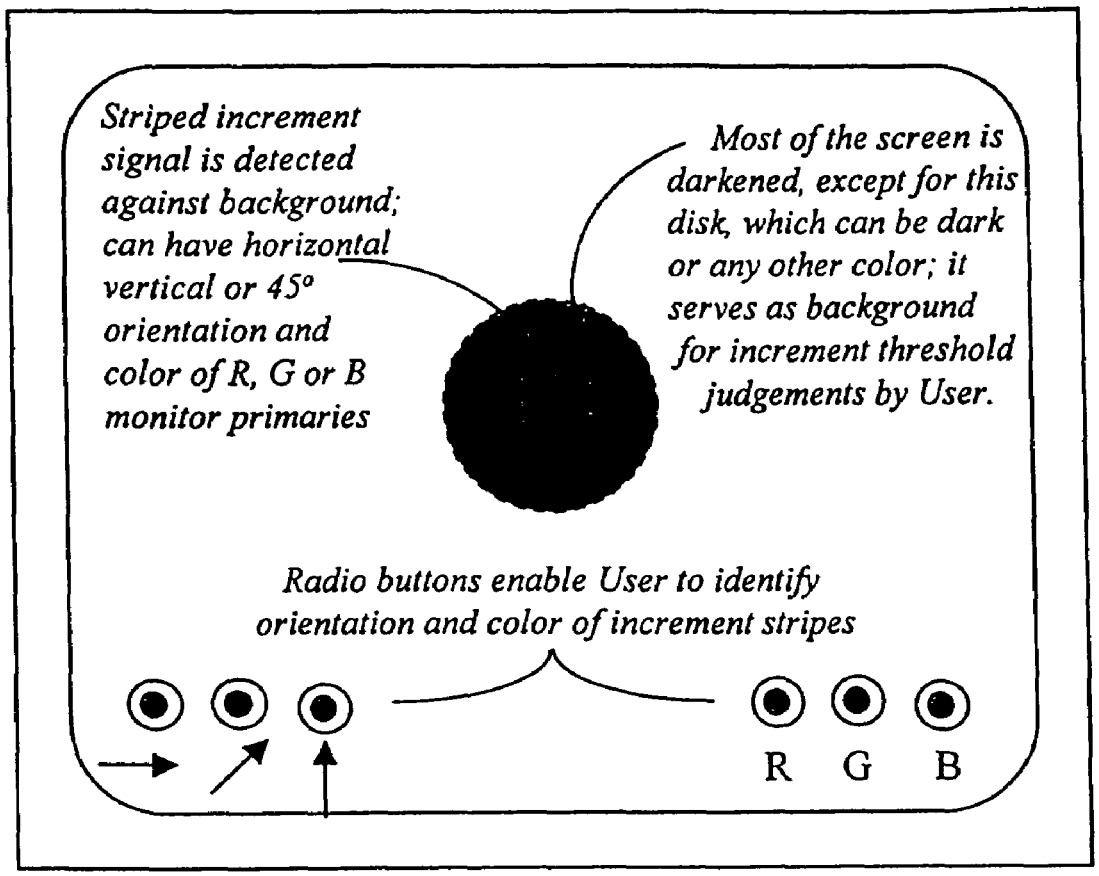
FIG. 6 is a screen of the same user interface as FIG. 5 for enabling the user to interact with the software application operating to enable the method of FIG. 4 in which user perception of displayed color is provided in a stimulus configuration that might be used for increment/decrement threshold measurements.

FIG. 6 illustrates another display screen provided to the user (having selected step 1 of the FIG. 5 screen) in which the stimulus configuration is shown for increment or decrement thresholds. In the latter case, the stripes would appear just noticeably darker than the background at threshold, rather than just detectably lighter. In either case, the idea is to adjust the brightness of the stripes until they appear just noticeably brighter or dimmer than the background. When the User clicks the mouse, coupled to the computer, upon one or more radio buttons on the screen, the user is indicating to the computer that "I just see the change", and the computer then records the difference in intensity of stripes from background. This quantity is the increment or decrement threshold difference.

As noted earlier, the size of the difference depends very characteristically on the background level. Therefore, the method refers to the normative data in order to determine what absolute luminance displayed are associated with which digital codes from the host computer. Normative data are collected from one or more human subjects using the threshold methods described while also measuring luminances (and other relevant variables) of the stimulus configuration with a calibrated instrument. Preparation of normative data is discussed later, in connection with FIGS. 9A-9B.

The method includes safeguards against User carelessness and variability. A test trial proceeds as follows: Set the background level as desired and instruct the User to spend a few moments looking at the screen and adapting to its level of illumination. It is assumed that the User has not recently or is not currently viewing a very bright source, such as nearly direct sunlight streaming in a window behind the display. In the latter case, several minutes of adaptation to normal display screen luminance levels may be required for good threshold data. Then either sound a beep or flash a faint ring of light on the screen near where he should be attending and then present the striped increment/decrement stimulus pattern at some luminance level. Move up and down in luminance, asking the User to indicate when the patterns just become visible and/or invisible; in this way, the threshold difference is identified.

As a check on reliability, each time the User indicates threshold discriminability, the user is asked to identify the orientation (horizontal, vertical or 45°) and/or the color of the stripes. If the user is not correct, the user may not have been attending to the task properly and additional trials are needed. This kind of reliability check works best when the stimulus is initially invisible and is raised to the threshold level.

It is advantageous to oscillate the stripes through a displacement of one-half cycle of the stimulus pattern. It is convenient to use a 1-dimensional, spatial, square wave pattern as the stimulus. A spatial frequency of the pattern of about 5 cycles per degree of visual angle is useful, but the exact frequency is not critical. For further information, see T. N. Cornsweet, *Visual Perception*, NY: Academic Press, 1970, pp. 475, for a clear and detailed discussion of increment thresholds, spatial and temporal frequencies of visual stimulation and other psychophysical concepts employed in this disclosure. The stripes may be oscillated at about 5-10 Hz.

Quantization may make it impossible to measure the threshold difference with sufficient accuracy. For instance, digital code 223 (of an 8-bit maximum of 255) from the host computer may be indistinguishable from background illumination on the display while level 224 is very distinguishable. This can be dealt with by treating each stimulus presentation as a succession of frames. If it were desired to present level 223.5, one could do so by presenting 5 frames of 223 and five of 224 during an interval consisting of 10 frames. The interval must be short enough that the eye will integrate the frames temporally. In this way it is possible to increase resolution and measure accurate thresholds and estimates of absolute physical quantities. The stimulus presentation might be implemented with the help of Quick Time (trademark Apple Computer, Inc.) movies or functionally equivalent means.

Before measuring any thresholds, all the gamma-compensation LUTs in the system should be disabled. By setting each channel to full-scale (i.e., a digital drive of 255, or whatever code is maximum) or 85-90% of full-scale (in terms of digital codes from the host) and then measuring the decrement threshold we hope to find out what the absolute luminance is in each of the channels and what the balance among the channels is. FIG. 4, step 42, if the monitor is operating in a range where superposition applies, the knowledge of max Luminance in each of the three channels yields the balance vector of the color mixture matrix equation presented earlier. It is assumed that we already know the chromaticity matrix for any given make of monitor or for a particular device. With this information, the white point, or the change in balance needed to achieve a desired white point, can be calculated. If necessary, iterative threshold discriminations can be made to ensure that the desired white point is achieved.

In order to ensure that a monitor is operating in a range where superposition applies, the operating brightness level of the display is set to about 60% of its maximum. The 60% level is set by instructing the User to lower the Brightness (if manual adjustment is necessary, i.e., if system resources for automatic adjustment are unavailable) until a pre-defined threshold point is reached. This may be faster than an alternative procedure (mentioned in FIG. 4, at step 42) of performing a descending series of iterative threshold discriminations. The brightness adjustment can be made using the Green channel only, although either the Red or the Blue channels could be used.

Measuring the increment threshold when the background is R=G=B=0 (FIG. 4, step 44) can serve two purposes. In a darkened room, it indicates what the balance of the three channels is in the deep shadows. If the shadows have a neutral balance other than that at highlight, this could be corrected by modifying LUTs in the graphics section or by modifying circuit parameters in the physical display, should the latter be accessible to control from the host. Remeasuring the threshold with room lights at normal working levels provides a way to estimate the amount of ambient backlight reflected off the screen as well as its effect on the monitor's color reproduction. In both cases, results contribute to adjustments to the Virtual Proof (FIG. 4, step 45) and to more accurate network color.

If the User cannot or will not darken the room adequately, the desired information may be estimated by measuring increment thresholds at levels intermediate between highlight and shadow. In effect, this is measuring the gamma or tone reproduction curve of the monitor by the increment threshold technique. Resulting data may be used to project the function into the shadows and thereby estimate the parameters of interest.

The second part of the visual calibration procedure (numeral 46, FIG. 4, labeled "step 2" in FIG. 5) uses transparency materials, such as printed transparent plastic sheets, and visual comparisons by a User to verify results based upon visual thresholds.

Figure 7:
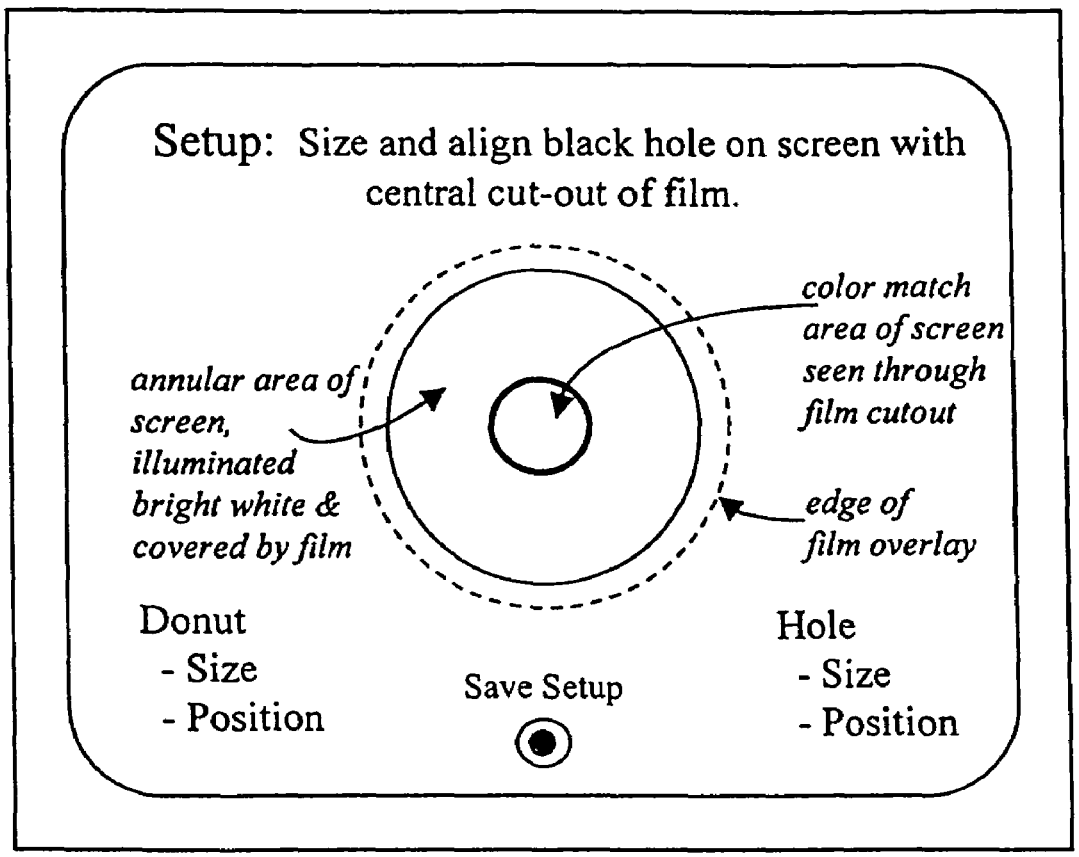
FIGS. 7 and 8 are two screens of the same user interface of FIG. 5 for color matching to reference films placed onto screen to enable subjective, metomeric color matching experiments to verify white balance settings of the display.
Figure 8:
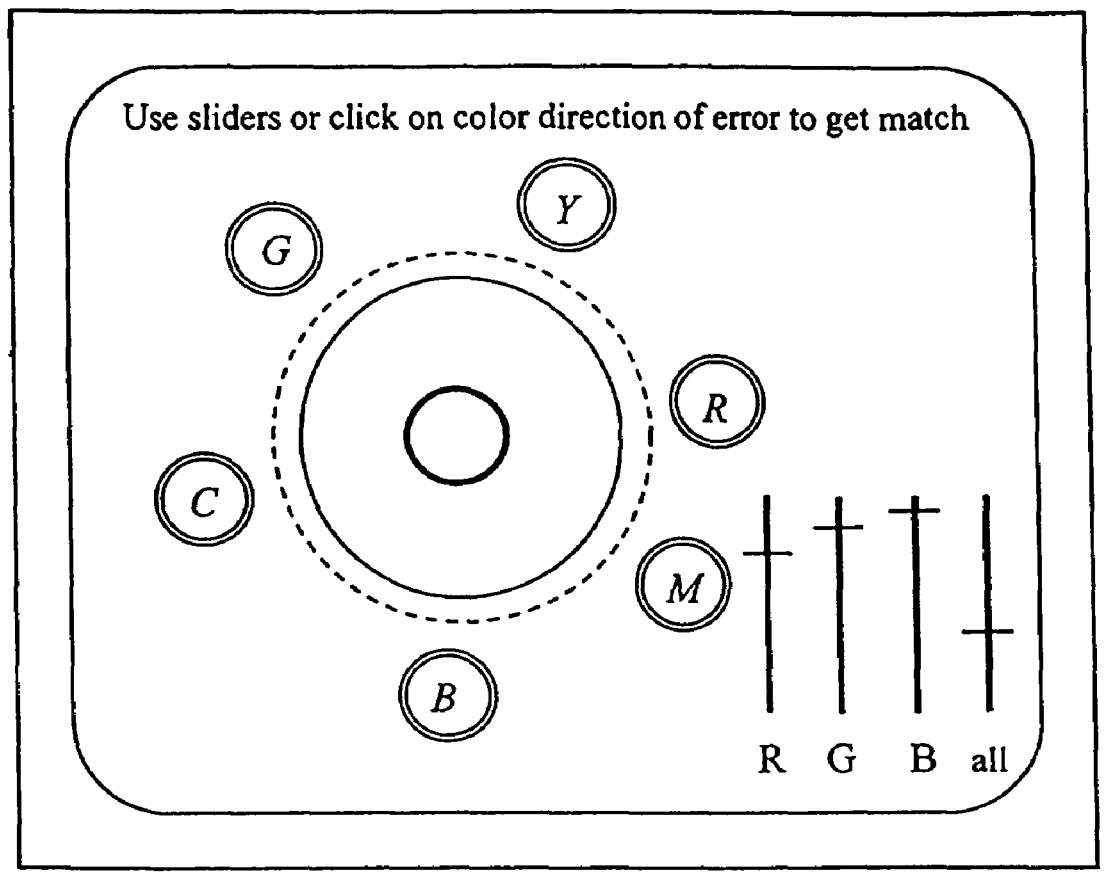

Referring to FIGS. 7-8, a method step 46 of FIG. 4 (labeled step 2 of FIG. 5) for estimating color mixture properties of a monitor by color matching for white point verification will be described. FIG. 7 shows an opening screen to setup procedure for a "color matching experiment" for FIG. 8, not unlike those performed in order to define the Standard Observer. An annular piece of colored transparency creates a condition of metamerism between the light emerging through the film and light emerging through the central hole when a visual match is achieved by the observer. Italicized annotations on FIG. 7 provide additional explanation.

The monitor image consists of a central area, whose color can be changed by the User as shown in FIG. 8. The central area is exposed through a hole in a film overlay which covers an outer ring of the monitor display which is illuminated at the full-field white (or at 85 or 90% of digital full field in order to allow "head room." The latter is important since some matches may require more than the "maximum" amount of one or more of the primaries.)

In FIG. 8, two methods available to the User for adjusting the central area to match the ring (white seen through colored film.) In one, circular swatches of color surround the ring. Each swatch shows the current match color shifted slightly in the direction of yellow, green, cyan, etc. The User can click on whatever swatch indicates the direction of color error in the attempted match. The match is changed accordingly. Alternatively, or in addition to the swatch method, the User can operate slide bars to vary the amounts of R, G and B separately or all together in order to match the central disc to the surround.

Once amounts of R, G and B required for a visual match are determined, the values are converted into r,g chromaticity values which are used to predict the x,y chromaticities of the prevailing white point. A simple, linear relationship (representable by a 2×2 matrix) provides a reasonable approximation to the relationship between the pairs of variables—i.e., r,g chromaticities of the monitor and x,y chromaticities of the Standard Observer. However, other empirically-defined functions may be used as accuracy requires.

To clarify the method further: The User in the color matching exercise adjusts the amounts of RGB primaries in the "donut hole" in order to match the donut. The chromaticity coordinate, $r=R/(R+G+B)$, according to the familiar, projective transformation used to define chromaticities in the CIE system. r,g chromaticities estimated (by visual means) and computed as outlined herein, can be used to access, through an experimentally pre-determined functional mapping (normative data), the x,y chromaticities of the prevailing white point.

From these data it is possible to work back to the changes in R, G and B needed to achieve the desired highlight neutral balance. Referring, again, to the color mixture matrix equation presented earlier, the x,y chromaticities of the prevailing white point are known, the primary chromaticities of the monitor type are known or can be assumed and it is possible to compute the prevailing balance vector by conventional matrix calculations. Then the balance changes needed to get to the desired white point can be computed. In the foregoing procedure, it is helpful to have data from threshold work, but it is not essential. To improve reliability, the color matching experiment may be repeated with film donuts of different colors.

Figure 9A:
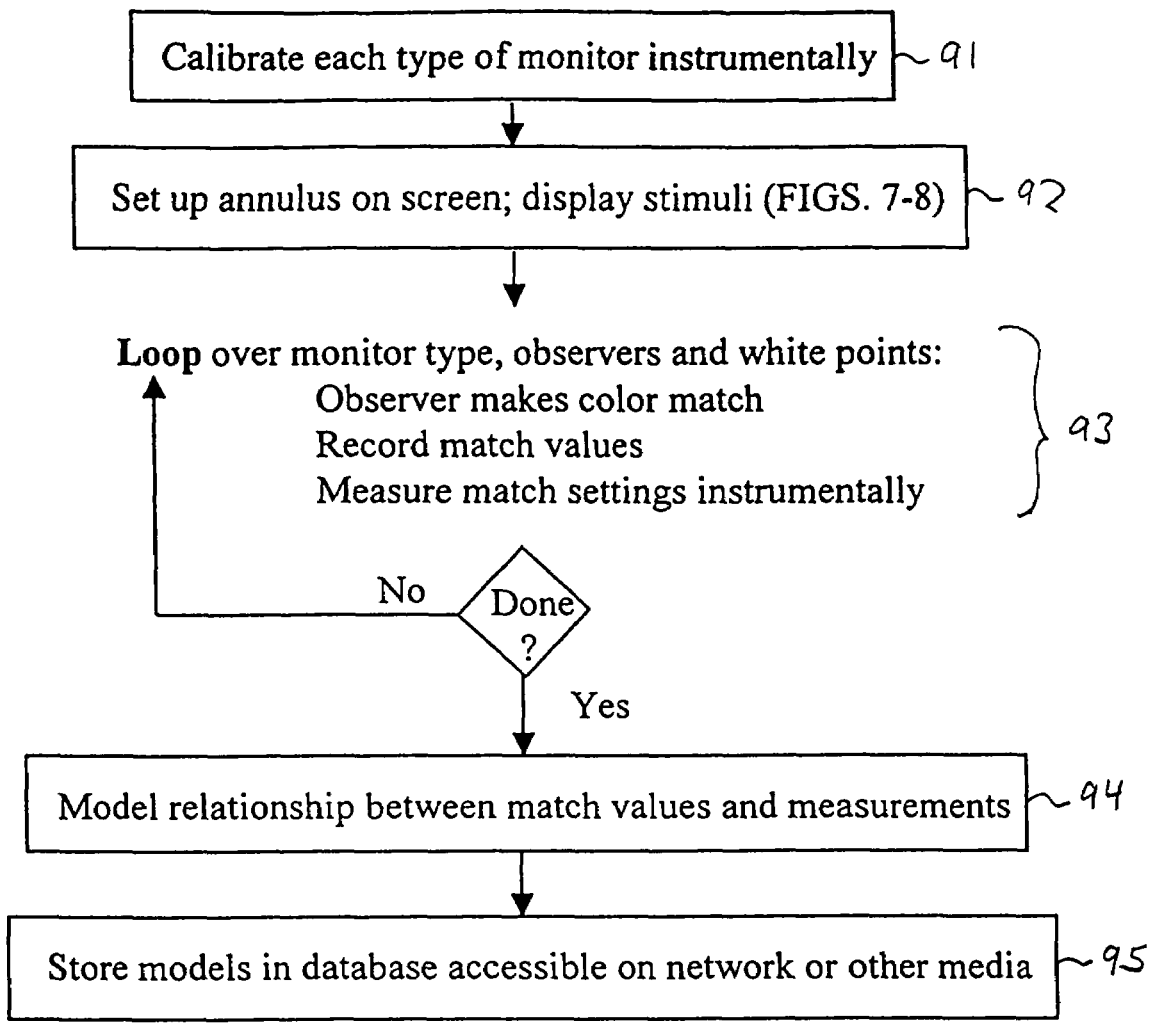
FIGS. 9A and 9B are flow diagrams showing a method for obtaining normative reference data for subjective calibration, and using the reference data in calibrating a display, in which the user performs color matching using the screens of FIGS. 7 and 8 to provide white balance.

Referring to FIGS. 9A, the pre-determined functional mapping in the preceding paragraph is based on normative data gathered as follows: One or more color-normal observers performs the color-matching experiment described at a variety of white balance adjustments of a monitor. Preferably, the experiments are performed for various monitor types (steps 92-93). The x,y chromaticities (or other relevant variables) corresponding to each balance vector or setting are measured with an accurate colorimeter (step 91). The r,g chromaticities corresponding to the observer's match settings are recorded. These data are used to specify a functional mapping such as the linear 2×2 matrix alluded to above. Any mapping that ensures sufficient accuracy is compatible with the method (step 94). Likewise, other variables derived from the color matching data may be modeled compatibly, according to the method. In other words, to prepare normative color-matching data, each type of monitor instrumentality, such as a sensor, is calibrated (step 91). The annulus on screen are set up as shown in FIG. 7, and display stimuli as shown in FIG. 8. For each types of monitor, observer makes the color match to the annulus, and then the color value in R G and B is recorded for the color and associated with measurement recorded from the sensor (step 93). A model relationship is determined by the computer between match values and measurements (step 93), and the model is stored in a database accessible on network or other media (step 94).

Figure 9B:
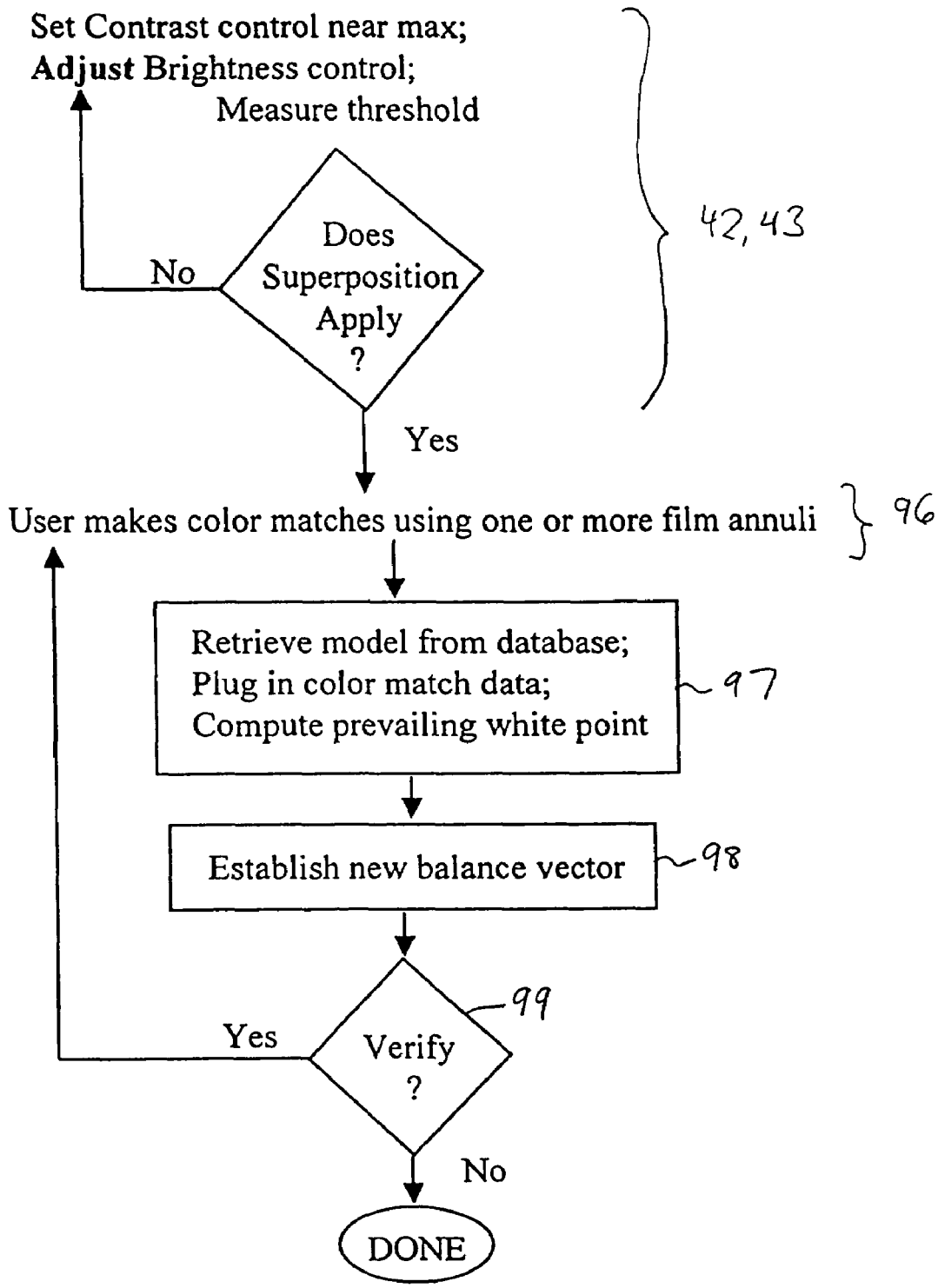

Referring to FIG. 9B, we briefly review the method of subjective display set-up and calibration, outlined in FIG. 4, with reference to the normative data. Steps 42 and 43 of FIG. 4 are shown in FIG. 9B. At step 96, a User who wishes to verify the white balance adjustment of her display, subjectively, does so by way of judgments similar to those made by the Observer in normative experiments at step 93 in FIG. 9A. At step 97, User-match data are used to infer the display's white balance data rather than to be fitted to them as in FIG. 9A. At steps 98 and 99, the inferred white balance may be compared to that derived by threshold methods (FIG. 4) or may be used to calculate a desired adjustment to white balance settings. In other words, to use normative data collected in FIG. 9A in subjective calibration provided by the user, the contrast control is set near max and Brightness control adjusted and the threshold is measured until superposition occurs (step 42-43). The user then makes color matches using one or more film annuli as described in connection with FIGS. 7-8 (step 96), and the computer retrieve the model from database, and plug in color match data to compute prevailing white points (step 97). A new balance vector is established (step 98), and if not verified by the user (step 99), steps 96-99 are repeated.

Thus, given knowledge of the type of monitor, there is information about the phosphor chromaticities and basic color mixture matrix. (If the type is not known, it should be possible to form an educated guess and take steps that will improve color rendering by the display.) In order to make a profile, or color translator, the matrix needs to be adjusted for a particular white balance. In order to do this, the initial white balance must be known. If the threshold methods outlined earlier are successful, then the color matching method outlined in this section may be used to verify or supplement data from thresholds.

Figure 10:
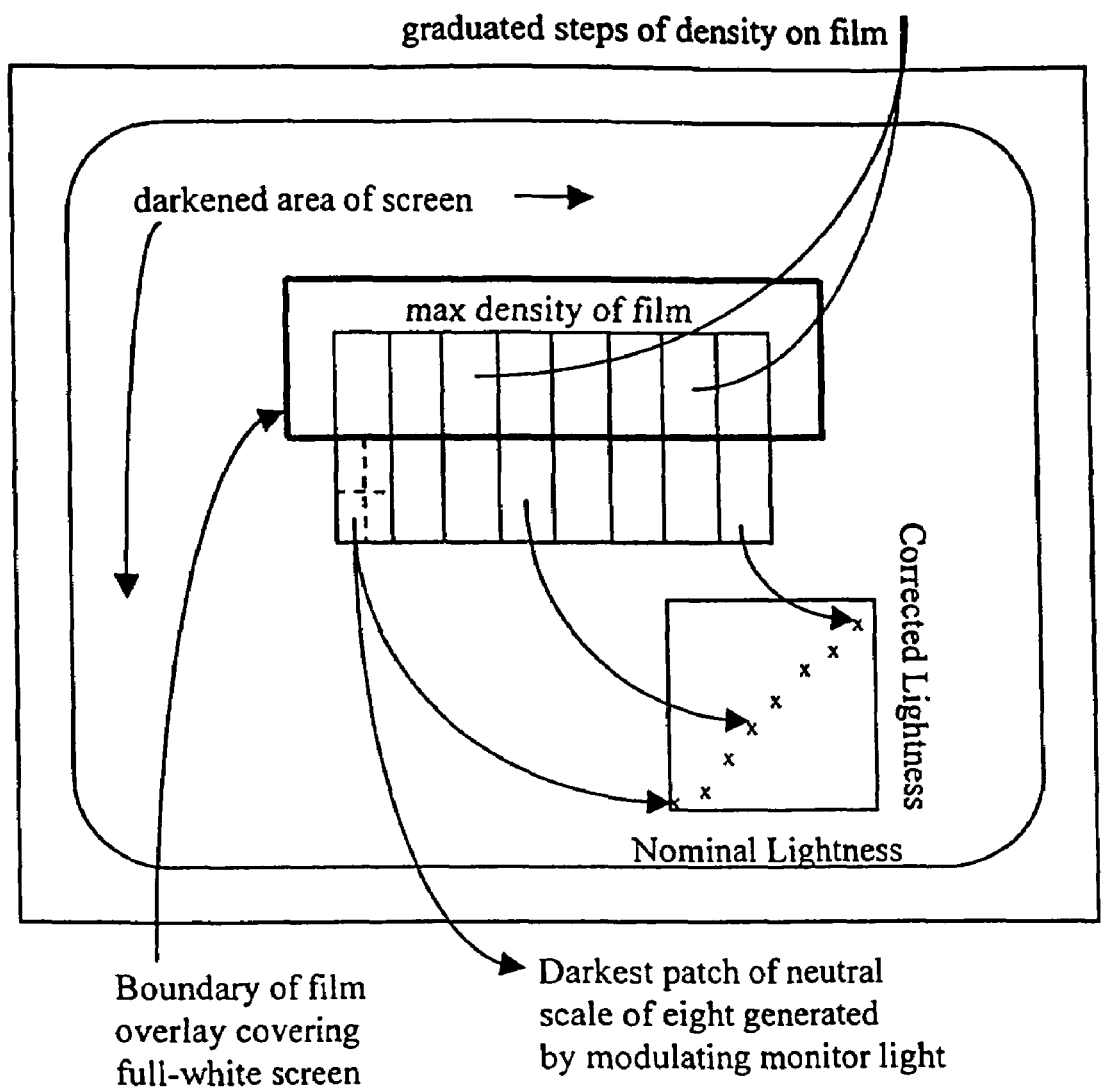
FIG. 10 is a screen of the same user interface of FIG. 5 for enabling subjectively derived adjustments from the user to tone reproduction.

Referring to FIG. 10, a method for verifying and/or fine tuning tone reproduction will be described to produce very good agreement between two monitors. This may be an additional part of step 46 of FIG. 4 after color matching of FIGS. 7, 8, 9A-9B, are performed. FIG. 10 shows a screen for adjusting tone reproduction without hardware assist. This exercise should follow neutral balancing and does not require a film reference target, although having a reference makes it easier. If a film reference were omitted, the User would have to make subjective judgments of uniformity in the steps of lightness of a gray scale step wedge painted (displayed) on the screen of the display by the host computer in accordance with an application program or software. Although, with patience and some training, humans can arrange a series of samples into steps along an uniform scale, it is not the preferred method. Therefore, the preferred method is to use a film reference.

The configuration and associated functionality are illustrated in FIG. 10. The film reference is suggested by the heavy black rectangle. Within it are 8 patches ranging from fairly dense to very low in density, proceeding from left to right. The area of the film outside the patches should be close to the maximum density. These may be conveniently manufactured on black & white lith film using a calibrated, linearized halftone separation film recorder, although a continuous tone target may also be made. The screen ruling of a halftoned image should be such as to minimize moire or beating patterns with the underlying pixel structure of the video display.

The target would be affixed to the screen over an area slightly smaller than the film target. That area of the display will be driven to full scale white. The rest of the screen should be left dark, except for an array of 8 neutral patches which should be moveable by the User to butt up to the corresponding gray scale patches of the film target. (The exact number of patches in the scale is not critical and the User can choose to work on selected patches, relying on spline- or Bezier-like techniques to ensure a smooth tonal mapping.) In the bottom right corner of the screen is shown a graphical gradation curve on which each patch of the monitor's gray scale is represented by an "x" or a numerical indicator that correlates with the displayed gray scale. Initially, the x's appear on a line of slope 1, as though the initial tonal transfer characteristic of the monitor were correct.

The User can move the x's up or down as needed to match the lightnesses of corresponding steps of the film and monitor gray scales. Corrections indicated by the Users in this process will be used to correct the gains and offsets within the display and/or the LUTs in the graphic display section of the host. Specifically, the corrections made, either channel-by-channel, or on the sum of the channels, in order to match the displayed gray scale to the film gray scale, are recorded by the software and then used according to the well-known algorithm (cf., H. E. Rose, 1955, "Adaptation of electronic color correction to the printing process," *TAGA Proceedings*, pp. 15-27, published by the Technical Association of the Graphic Arts, Rochester, N.Y. 14623) illustrated in FIG. 30, application Ser. No. 09/139,498, to bring the physical display into conformance with what is assumed in the software.

Methods of acquiring the relevant data have been described above to provide calibration data regarding viewing conditions, maximum Luminance levels and like variables, which may be used to optimize Virtual Proofing. Examples of use of the calibration data are reviewed below.

First, maximum luminance is considered. In Table One, two monitors of Type I are observed to differ in the maximum Luminance attainable. Two strategies for dealing with the difference are outlined in this section. The difference can be detected automatically and instrumentally or by using the visual calibration technologies disclosed herein. Either way, the max. luminance at different nodes are stored in a field of the Virtual Proof and compared as part of the preparation for critical viewing.

One strategy calls for reducing the maximum Luminances at other, participating nodes to that prevailing at the node of lowest maximum. This is analogous to the "least common gamut" method mentioned in U.S. Pat. No. 6,043,909. It is useful in a situation in which a small number of collaborators (e.g., users at different rendering devices, such as color displays) wish to be confident that they are seeing the same thing (color) and in which the Luminance restriction is not too limiting of color appreciation. Profiles for the different monitors may not have to be modified unless they encode absolute luminances—this is generally not the case. Instrumental and visual methods have been disclosed in this and earlier, pending applications for adjusting down the max. Luminance by the desired amount—visually, they might take the form of a contrast adjustment that is analogous to the brightness adjustment discussed in connection with superposition earlier.

A second strategy employs tonal remappings according to equivalent appearance models such as those discussed by Bartleson and Breneman ("Brightness perception in complex fields," *J. Opt. Soc. Amer.* 57: 953-957, 1967) and by Holub, et al. ("Color systems calibration for graphic arts. II: Output devices," *J. Imaging Technol.*, 14: 53-60, 1988.) There are many models of color appearance and perceptual constancy that could be used as a basis for calculating profiles for different nodal displays apropos of consistent color. Models of Guth, Hunt, Land, Nayatani and others are well known and many have been applied with varying degrees of success in computer imaging applications. The two studies cited above describe simple adjustments to tonal gradation functions intended to compensate for most of the differences occasioned by different maximum luminance levels.

The kind of approach outlined in the preceding paragraph may be preferred in applications such as e-commerce. A clothier posting images of garments on its web site would want to include information about the assumed Luminance of viewing (or, more generally, about the assumed gamut of a rendering device.) At a particular consumer's node, a browser applet would compare the "recommended" viewing conditions stored and communicated through the Virtual Proof to those prevailing locally and modify at least the tone reproduction aspects of the local monitor profile in order to represent the imagery more consistently with the clothier's intentions. Since the CEE variable of Chroma ("perceived saturation") depends on Luminance, the image-viewing applet might well want to modify the device profile so as to enhance saturation as well.

Figure 11:
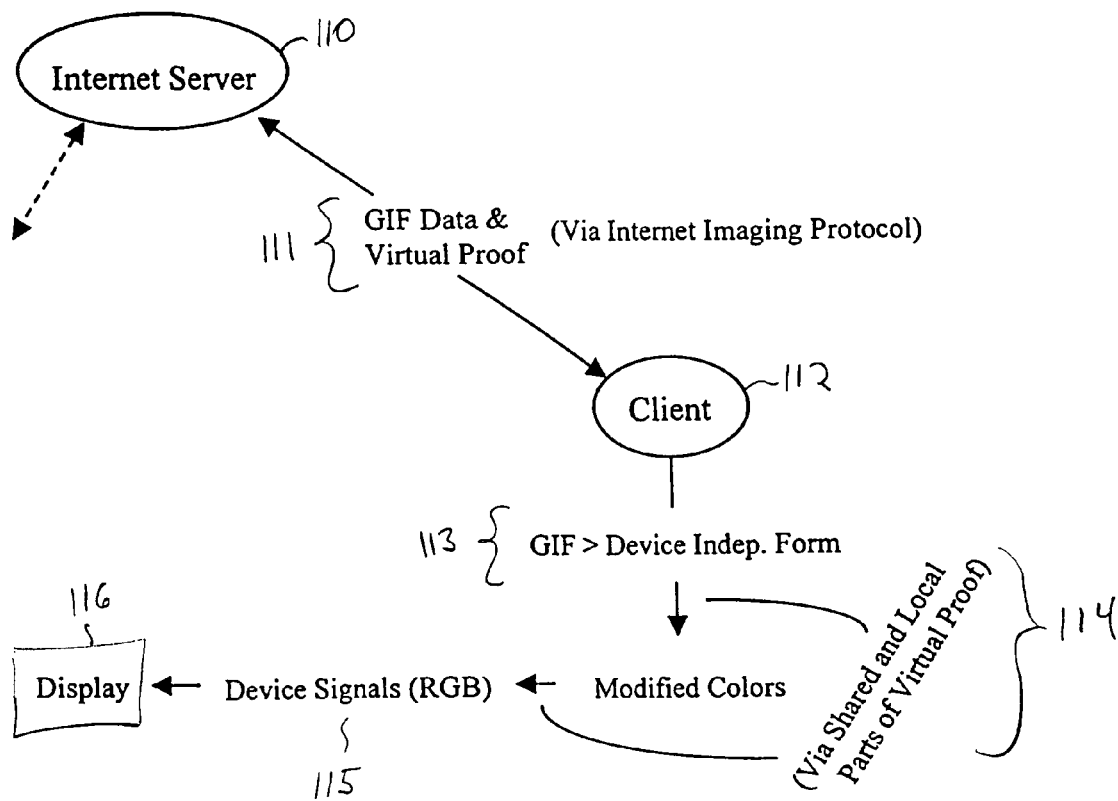
FIG. 11 is a block diagram of communication by an Internet or WWW (World Wide Web) server with a client computer for virtual proofing on a display coupled to a computer.

FIG. 11 expresses the relationship described in the preceding paragraph schematically in which an Internet server 111 provides a web site to which a client computer 112 (or 20 in FIG. 2) can be connected via the Internet or WWW through browser software at the client computer, such as to received GIF Data and Virtual Proof (or data structure) 111. GIF is an image file format that is common in Internet applications. Others, such as JPEG, are possible. At this time, GIF images do not generally have a device independent interpretation; hence, a conversion 113 is shown at the client, and colors modified (via shared and local parts of Virtual Proof) 114 for output via signals 115 to display 116 (or 21 in FIG. 2). It would be preferable if device independent data could be issued from the server or image source.

Next, viewing conditions in terms of the effects of ambient illumination is considered. For example, in the situation in which the consumer is at home and is paying a visit to the clothier's web site. Morning light is streaming in the window and reflecting from the screen into the consumer's eyes. As was mentioned earlier, this reflected ambient light adds to that emitted by the display with potentially dramatic effects on dynamic range and saturation—i.e., on the gamut of the display. In the case in which the effects of ambient illumination are dramatic enough, it may not be possible to make any compensation which will ensure that a garment is displayed with sufficient color accuracy.

The browser applet, on comparing intended gamut with realizable, could either warn the consumer that his color is not credible and/or could use gamut filter technology (gamuts, gamut descriptors expressing models of device gamuts, gamut mapping strategies and gamut filters are discussed in considerable detail in U.S. Pat. No. 6,043,909) to show the consumer what regions in the image are not faithfully reproduced.

Figure 12:
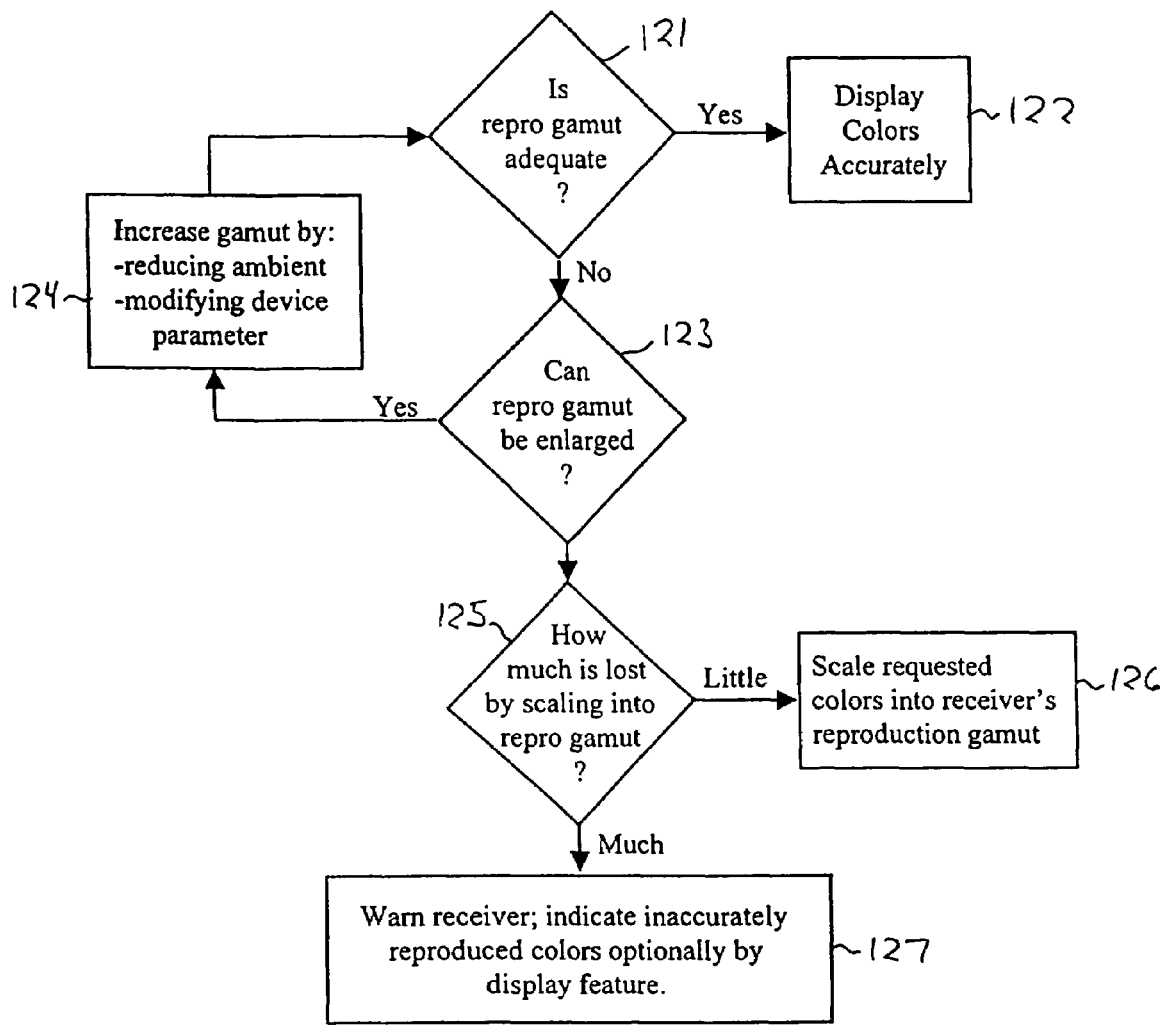
FIG. 12 is a flow diagram of a method for operating a color monitor when the color gamut (range of color) is not adequate to display colors on the color monitor.

More generally, referring to FIG. 12, given an intended gamut conveyed through a Virtual Proof, available strategies include:

1) If the reproduction gamut at the receiving node is adequate to reproduce all colors faithfully (step 121), then simply display the colors accurately (step 122)

2) If the reproduction gamut is not adequate (step 121), then can the gamut be enlarged (step 123)

a) using instrumental or visual calibration technologies to guide the process, do what can be done (increasing Brightness or dynamic range, etc.) to increase the gamut of the device. This could include an advisory to the consumer to mitigate the ambient illumination (step 124)

b) if the deficiencies of gamut at the receiver are not too limiting, and thus the gamut cannot be enlarged (step 123) or do not affect critical colors (such as important garment colors which could be flagged either in a gamut filter or in a special field of the Virtual Proof) then gamut-scaling techniques discussed in the earlier application could be employed to display a sufficiently faithful reproduction if only a little of the gamut is lost (steps 125 and 126)

c) otherwise, warn (notify) the receiver (or user), and use gamut filters to show the consumer which colors are poorly reproduced (step 127). The increase of device gamut of step 124 and scaling of step 126 are not mutually exclusive.

To be very clear about how the receiver's display gamut is known: Instrumental and/or visual techniques are employed to obtain calibration data about the device. Calculation of a gamut descriptor (which represents all the colors reproducible with a device) was disclosed in U.S. Pat. No. 6,043,909. Briefly, an appropriately white-balanced color mixture matrix and a set of tone reproduction curves are sufficient for most applications to model a display which demonstrates superposition as explained earlier in this application.

There are various ways of representing the effects of ambient, but one directly incorporates its effects into the primary chromaticities and the tone reproduction curves and, thereby, into the gamut descriptor. Alternatively, colors are often expressed as XYZ TriStimulus Variables (TSVs) in the course of being converted into CIELAB or similar uniform coordinates that may be employed in a gamut descriptor. At the TSV stage, the ambient, expressed as X, Y, Z coordinates may be added to the TSVs generated by the model (without any ambient effects incorporated.) Then the modified model output may be converted into perceptually uniform gamut descriptor coordinates expressive of ambient effects. However, the invention is not limited to the foregoing methods for modeling and incorporating effects of ambient illumination into gamut descriptors and Virtual Proofing data. It is also possible to represent compensations for the effects of differences in max luminance between two devices in terms of a gamut adjustment.

Other instrumentation than a single-channel sensor may be used for measuring color of the display screen. It was noted earlier that a single-channel sensor cannot discriminate the exact color of ambient light, only its level. One way of dealing with this is to query the User regarding the source of the environmental light by a software application operating at the host computer coupled to the display. For example, tungsten/incandescent, "cool white" fluorescent, etc. sources have fairly well-known spectral energy distributions which can be used to calculate the chromaticity coordinates of the ambient which is adding to the light emitted from the display. Another way of querying the observer is to employ the psychophysical methods outlined in previous sections. A single-channel device is also unable to detect changes in the chromaticity of one or more of the channels of the display if the spectral energy distribution of said channel changes in shape.

Figure 13:
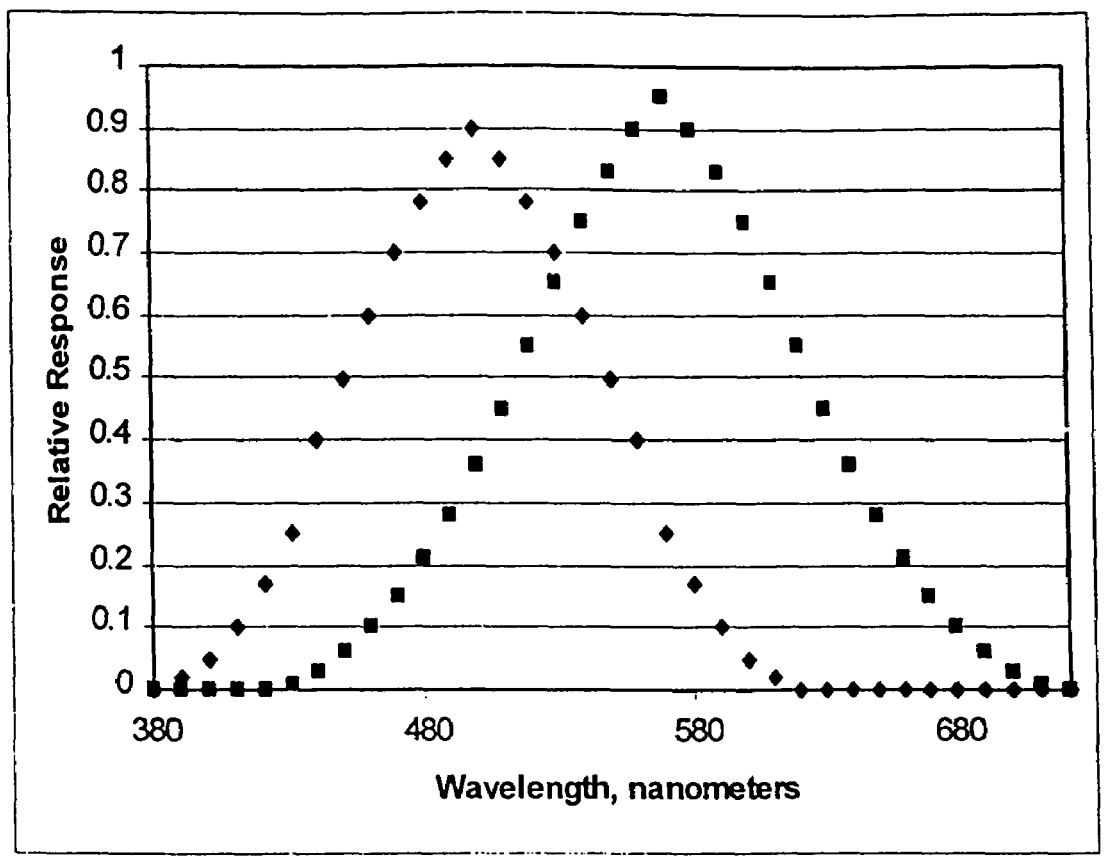
FIG. 13 is an example of a spectral response of a dual-channel sensor to measure or detect changes in the white point of a known illumination source.

Accurate colorimetry of arbitrary spectral stimuli requires convolution of said stimuli with weighting functions that are linear combinations of the human color matching functions. However, in cases where the stimuli are not arbitrary, but are singular, or few in number, and are known spectrally, it may be possible to use a simple sensor which does not match human spectral sensitivity. FIG. 13 shows spectral response functions of a dual-channel sensor that is based on a light-to-frequency converter such as that referred to in incorporated U.S. application Ser. No. 09/139,498. The method outlined here is similar to the method outlined in that application for detecting changes in the calibration of a self-calibrating spectral colorimeter.

The spectral response functions chosen for FIG. 13 are arbitrary. In general, it is preferable that they be broad, overlapping and cover, in concert at least, the entire visible spectrum. As shown, they can respond differentially to a change in the spectrum of a stimulus with which they are convolved. More channels than two provide greater ability to localize (by differential changes in the responses of individual channels) exactly where changes in the stimulus spectrum have occurred. In the limit of additional channels, of course, we obtain sampling characteristic of a spectral sensor.

Figure 14:
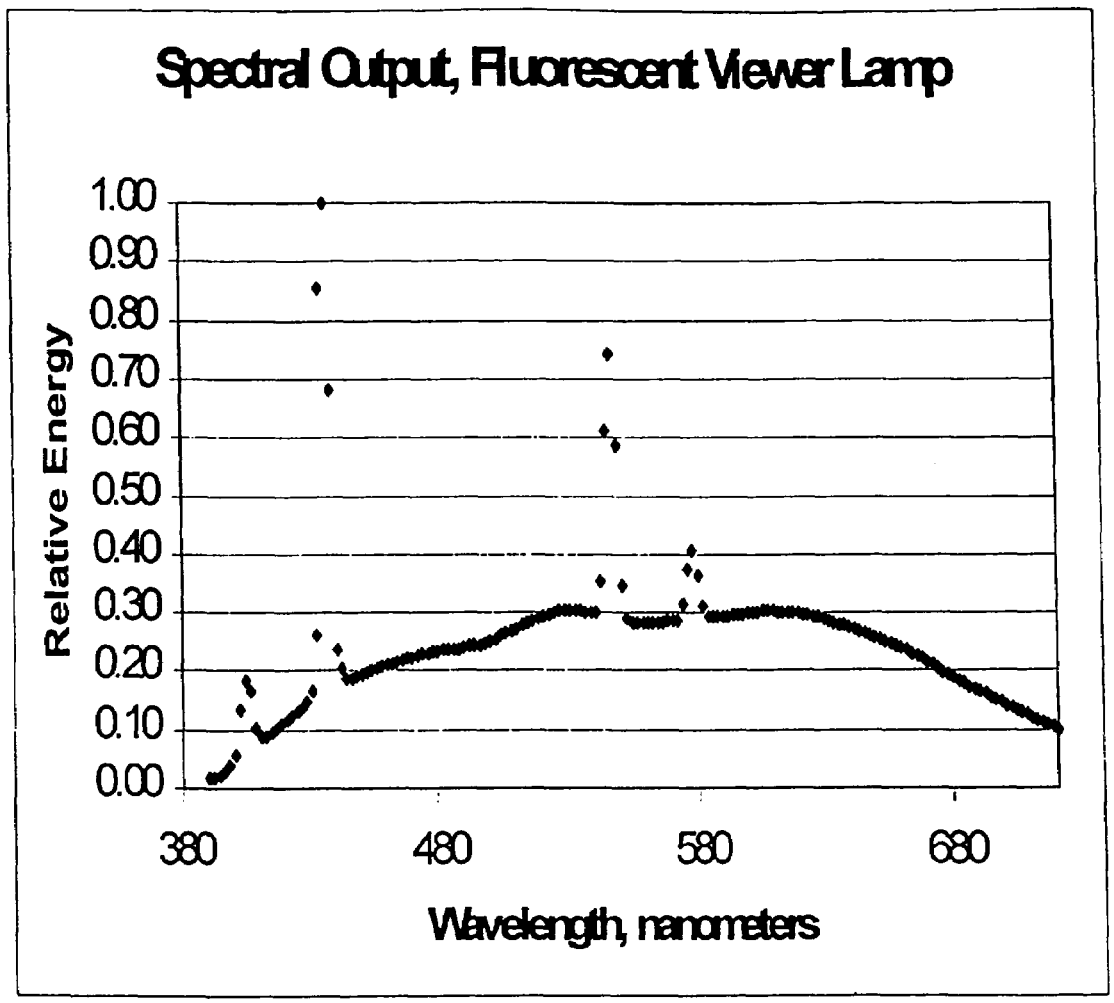
FIG. 14 is an example of a stimulus spectrum of a fluorescent lamp reflected off a white stock in which the lamp is commonly used for appraisal of reflection color images.

FIG. 14 illustrates a "stimulus spectrum," i.e., that of a fluorescent lamp reflected off a white proofing stock. If changes in that stimulus were predictable, then the dual channel sensor could be calibrated to record chromaticity changes reliably. For example, if the spikes in the spectrum never moved positionally, but fluctuated in relative amplitude, then the dual channel device could predict color changes accurately. The same would be true of other sources, such as video display channels. However, if the spectral changes in the stimulus were more complex and unpredictable, then the dual-channel sensor might be capable only of registering a change in the stimulus over time, indicating a need for re-calibration with a more sophisticated colorimeter.

The situation in which a dual-channel sensor may be preferable to a single channel device is one in which the User does not want to purchase an accurate (expensive) colorimeter but needs to be aware of changes in spectral shape of relevant stimuli, such as a fluorescent source in a viewing hood or a color channel of a video display.

Figure 15:
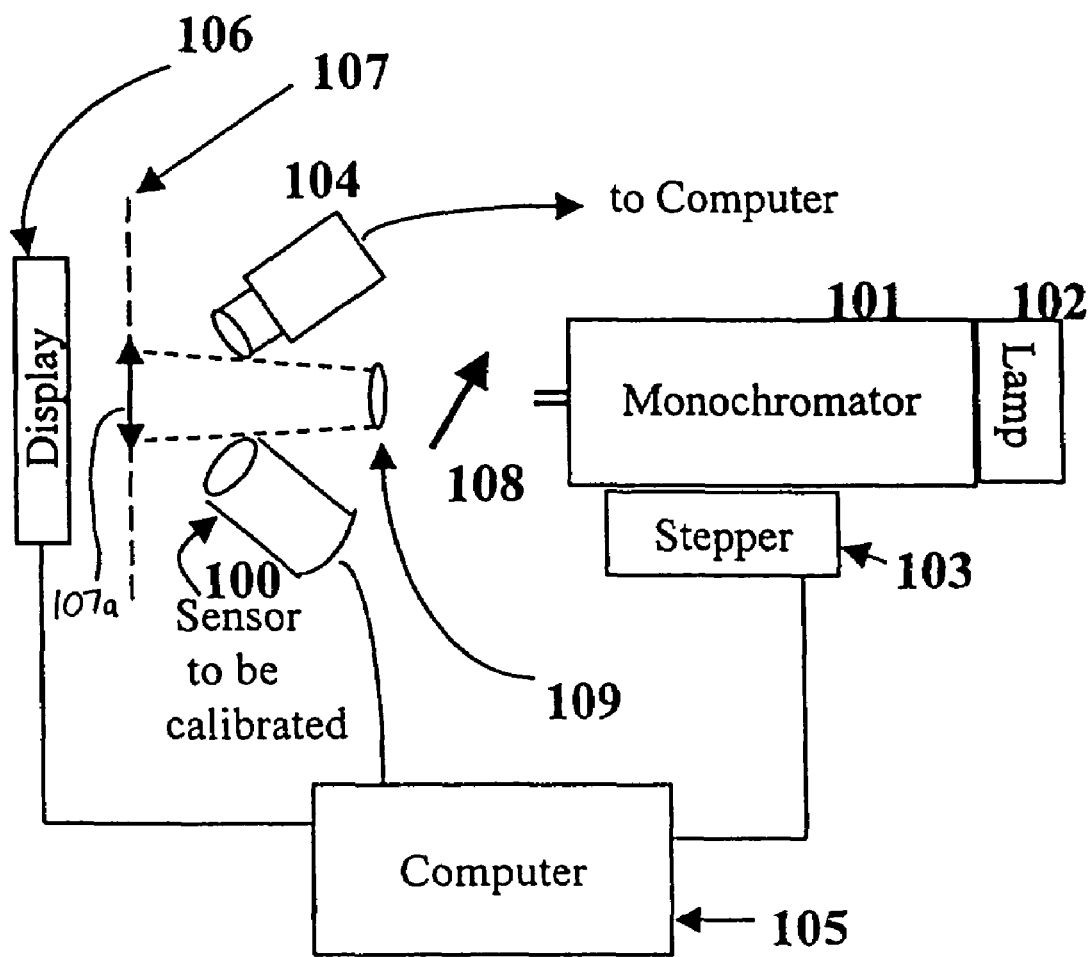
FIG. 15 is a block diagram of an apparatus for calibrating a dual channel sensor with a reference device and for verifying accuracy of calibration.
Figure 16:
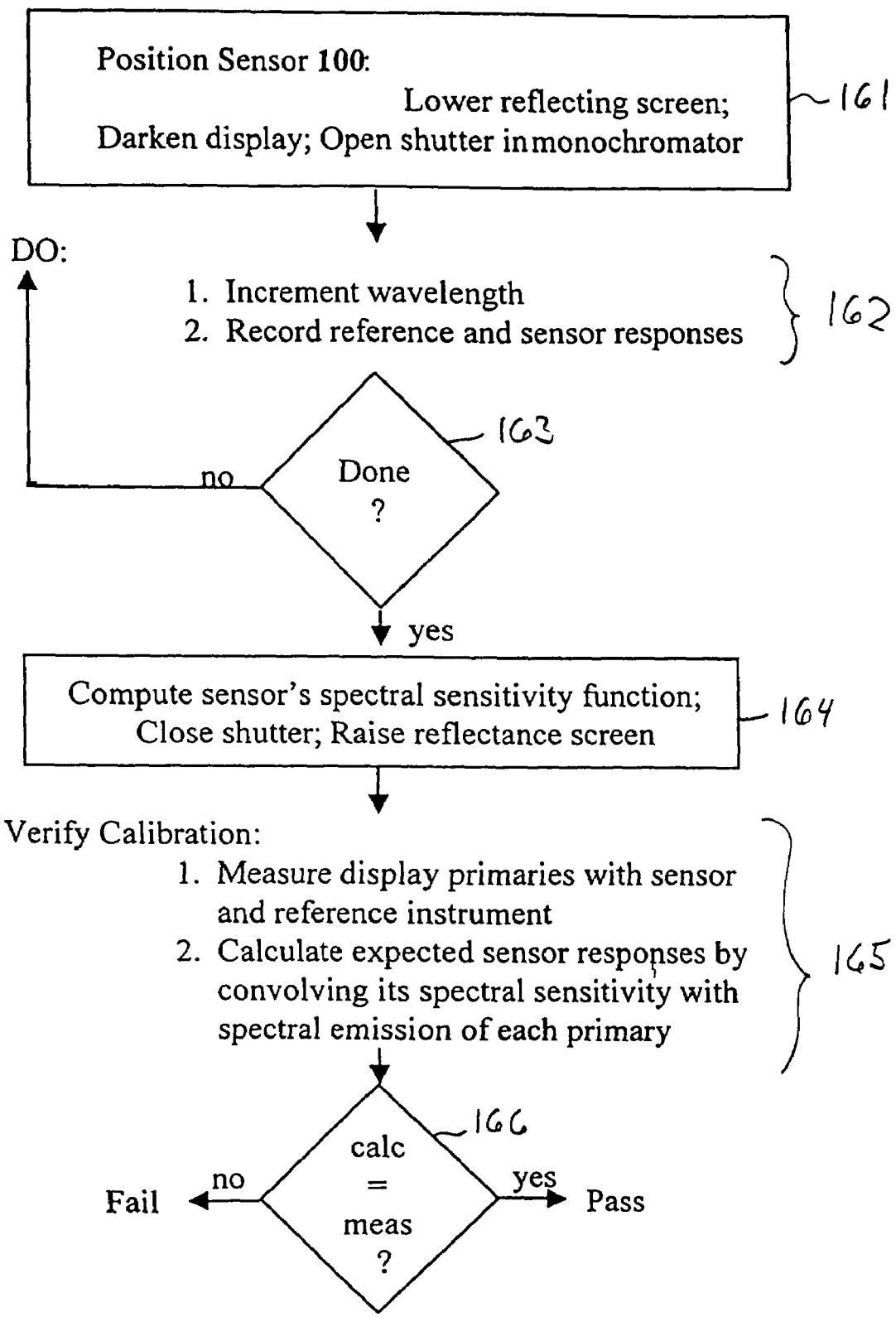
FIG. 16 is a flow diagram of the calibration operation using the system of FIG. 15.

FIG. 15 is a schematic of an apparatus for calibrating a sensor described in foregoing discussion, and FIG. 16 flowcharts the calibration procedure. Sensor 100 is a sensor which is to be calibrated. It is mounted in a fixture so as to view a white reflecting surface of a reflector 107*a*, such as upon sheet or board. The reflector can be moved, preferably by an arm that is computer-controlled, in and out of the line of sight of the sensor in a plane 107, indicated by a dashed line in FIG. 15. Reflector 107*a* may also be located manually by a user. A reference instrument 104, whose calibration is stable and traceable to a standards laboratory such as the U.S. National Institute of Standards and Technology, also views the same area on the reflector as the sensor to be calibrated. The reference instrument is one whose response at each, narrow waveband of the visual spectrum has been measured carefully as part of its calibration. It may be a spectral instrument, but need not be (FIG. 16, step 162). The goal is to transfer its calibration to the newly manufactured instrument; its calibration is likely to be more stable over time than that of the monochromatic source.

The monochromator 101 has a lamp assembly 102 to provide white light that is dispersed into component wavebands. (Edmund Scientific supplies a "mini-chrom" assembly, which integrates monochromator, lamp and stepping motor, along with controller software which is adequate for the purposes described here—see p. 222 of catalogue no. N987A.) A stepper motor 103 is operated by the computer to control the waveband of dispersed light that is focused on the exit slit of the monochromator. Light emerging from the slit can be shuttered by a shutter 108, i.e., prevented from reaching the reflector or allowed to reach it. A lens (or lens assembly) 109 is used to create a fairly uniform field of monochromatic illumination on the reflector in plane 107. The sensor-to-be-calibrated 100 and reference instrument 104 both view the uniformly illuminated field provided by reflector 107a.

In the flow chart of FIG. 16, to position sensor 100, the reflecting screen 107a is lowered, the display 106 darkened, and the shutter of the monochromator 101 is opened (step 161). The wavelength of illumination is incremented in wavebands such that the computer causes different, narrow bands of the visible spectrum, from about 380 nm to about 720 nm, to illuminate the field (steps 162 and 163). At each waveband, the computer measures and records the responses of sensor and reference instrument. These data are used to determine the spectral response function (plotting response of the sensor as a function of the wavelength of incident light) of a fully assembled (manufactured) sensor with reference to the known standard 104 (step 164). Next, the shutter is closed and the reflector 107a is moved out of the way, such as raised so that a video display screen 106 immediately behind the plane 107 is viewed by sensor 100 and reference instrument 104. The calibration is then verified (steps 165-166) The purpose of this second step is verification of the calibration and quality assurance of the sensor. A sheet of proofing stock illuminated by a fluorescent, viewing illuminator could be used en lieu of the video display. The primaries (primary colors) are each displayed and measured with the sensor and reference instrument, and the expected sensor response is calculated by convolving its spectral sensitivity with the spectral emission of each primary. If the calculated responses equal the measured responses (step 166), the calculation is verified, otherwise, the verification fails and steps 161-165 should be repeated.

The following further describes the verification provided at steps 165-166. As a result of prior measurements with a spectral instrument of adequate resolution (see application Ser. No. 09/139,498) the computer has stored data on the spectral emission characteristics of each of the primary channels of the display—typically these are called "red," "green" and "blue." However, other primaries are possible. The computer lights up each of the primary channels on the display in turn and measures and records the responses of the sensor-to-be-calibrated and the reference instrument. It calculates the response expected from the sensor using the relation:

$$R = k\Sigma[e(\lambda) * s(\lambda) \Delta\lambda] \quad (1),$$

where R is the Response of the sensor being calibrated, e is the spectral energy distribution of one of the display's primary channels, s is the spectral response function of the sensor as measured in the preceding step, k is a constant, $\lambda$ represents wavelength and $\Delta\lambda$ represents the wavelength increment of the summation. Equation (1) can be thought of as a convolution summation with a shift parameter equal to zero.

If it is desired to know the CIE Luminance, Y, that corresponds to R, it may be calculated as $$Y = k \Sigma[e(\lambda) * s(\lambda) * \rho(\lambda) \Delta\lambda] \quad (2),$$

where $\rho(\lambda)$ is the ratio of the value of the y-bar color matching function of the CIE Standard Observer to the response of the sensor at each wavelength. Of course, Y can also be calculated directly by its defining equation, but equation (2) shows the relationship to sensor sensitivity.

If the value of R calculated using equation (1) agrees sufficiently well with the value actually measured, the instrument passes quality assurance; otherwise, it fails. In most cases, a recalibration will suffice following an initial failure. Occasionally, an instrument must be discarded.

The calibration procedure outlined can be applied to single- or multi-channel sensors. With knowledge of the spectral response of the sensor and of the form and variations of the stimulus, it is possible to calculate changes in the color of the stimulus.

Apparatus and methods have been disclosed for cost-effective and highly accurate set-up, calibration and color-control of video displays.

From the foregoing description, it will be apparent that there has been provided improved methods and apparatus for color display calibration. Variations and modifications in the herein described methods and apparatus in accordance with the invention will undoubtedly suggest themselves to those skilled in the art. Accordingly, the foregoing description should be taken as illustrative and not in a limiting sense.

The invention claimed is:

1. A method of calibrating one or more color devices comprising the steps of:
adjusting color rendering of one or more devices to subjectively match one or more visible references, wherein said one or more visible references are not being rendered by said one or more devices being adjusted; and
measuring one or more calibration parameters of said one or more devices in which said measuring step is carried out after said adjusting step, and said one or more calibration parameters are in device independent units of color for use in calibrating said one or more devices.

2. The method according to claim 1 wherein at least one of said one or more devices represents a display, and said measuring step further comprises the step of measuring ambient illumination to provide data capable of being incorporated with gamut color data.

3. The method according to claim 2 wherein said measuring step is carried out one of with a sensor or subjectively by a user.

4. The method according to claim 1 wherein said one or more devices are two or more in number, and said method further comprises the step of storing said one or more parameters for use in calibrating said devices to improve color matching between said devices.

5. The method according to claim 1 wherein at least one of said visible references represents a hard-copy image, said method further comprises the step of displaying an image corresponding to said hard-copy image on a video monitor, wherein said adjusting step further comprises the step of editing by a user said image with color editing software on a computer system until the user realizes a visual match between one or more aspects of said hard-copy image and said image on said video monitor.

6. The method according to claim 5 wherein said measuring step further comprises the step of measuring by said computer system at least one or more of tone reproduction or neutral balance of the visually matched image.

7. The method according to claim 6 further comprising the step of communicating one or more of said measured tone reproduction and neutral balance, or correction functions for one or more of said measured tone reproduction and neutral balance, by said computer system to one or more sites for use with one or more color rendering devices at said sites to improve color matching between said one or more color rendering devices and said one or more devices being calibrated.

8. The method according to claim 5 further comprising the step of storing data representative of said color editing in a transformation table which maps original colors of the monitor to the colors after said editing step is carried out.

9. The: method according to claim 5 further comprising the step of calibrating one or more of tone reproduction and neutral balance of the color channels of the video monitor prior to carrying out said displaying and editing steps.

10. The method according to claim 1 wherein said measuring step is carried out one of with a sensor or subjectively by a user.

11. The method according to claim 1 further comprising the step of storing data representing at least one adjustment made to said one or more devices at said adjusting step.

12. The method according to claim 11 wherein said data comprises a transformation table for at least one of said one or more devices.

13. The method according to claim 1 wherein said one or more calibration parameters comprise one or more of tone reproduction, neutral balance, while point, color mixture data, ambient illumination, viewing conditions, offsets, gains, absolute luminance, head room, color temperature or gamma:

14. The method according to claim 1 wherein at least one of said one or more visible references represents a hard-copy image.

15. A method for modeling the color of a color display having a plurality of color channels comprising the steps of:
   comparing subjectively a displayed screen color to a visible color reference;
   changing the screen color to match the color reference;
   recording the color of screen which matches the color reference;
   measuring the displayed screen color which matches the color reference with a sensor, and storing the sensor measurement with the recorded screen color;
   repeating said comparing, changing, recording, and measuring steps with different color references; and
   modeling the relationship between the measurements and associated recorded screen colors to provide normative data of the color of the screen.

16. The method according to claim 15 further comprising the steps of:
   increasing the contrast of the display to about a maximum level for the display;
   increasing the brightness of the display for at least one color channel to about a maximum level for the display; and
   lowering the brightness of the display of at least said one color channel until superposition of colors is observed.

17. The method according to claim 16 further comprising the steps of:
   displaying at least one of the recorded screen colors;
   comparing the displayed recorded screen color with the associated color reference;
   changing the display screen color when needed to match the color reference;
   recording the color of screen which matches the color reference;
   measuring the displayed screen color which matches the color reference with a sensor to provide an updated sensor measurement, and storing the updated sensor measurement with the recorded screen color; and
   updating the model when the screen color was changed to match the color reference in accordance with the stored updated sensor measurement.

18. The method according to claim 15 wherein said measuring step occurs after said changing step is carried out for each of said different color references.

19. The method according to claim 15 further comprising the step of modifying at least one of brightness or contrast of the display toward a superposition of colors.

20. The method according to claim 15 wherein said color reference is presented on said color display in proximity to said displayed screen color and said changing step further comprises changing the displayed screen color to obtain a visual match in a condition of metamerism between the color reference and said displayed screen color.

21. A method of sharing color-matching preferences between devices associated in a network comprising the steps of:
   providing one or more visible references;
   adjusting color reproduction settings for at least one of said devices in order to improve the subjective match of said one or more visible references to a reproduction of each of said one or more visible references, wherein said one or more visible references are not being rendered by said one of said devices being adjusted, and said adjusting step adjusts information utilized for rendering a reproduction on said one of said devices without adjustment of any physical setting of said one of said devices; and
   providing said adjusted settings in device independent units of color in which said adjusted settings are shareable in a network.

22. The method according to claim 21 wherein at least one of said devices represents a display, and said method further comprises the step of providing data representative of ambient illumination with respect to said display.

23. The method according to claim 21 further comprising the step of sharing said adjusted settings in a network for use in calibrating devices in said network to enable improved color matching between said devices.

24. The method according to claim 21 wherein at least one of said one or more visible references represents a hard-copy image, said method further comprising the step of displaying an image corresponding to said hard-copy image on a video monitor, wherein said adjusting step further comprises the step of editing by a user said image with color editing software on a computer system until the user realizes a visual match between one or more aspects of said hard-copy image and said image on said video monitor.

25. The method according to claim 24 wherein said measuring step further comprises the step of measuring by said computer system one or more of tone reproduction or neutral balance of the visually matched image.

26. The method according to claim 21 further comprising the step of verifying the state of calibration of one or more of said devices, said state comprising at least white balance and tone reproduction settings, wherein said adjusting step adjusts color reproduction settings for at least one of said devices after said verifying step is carried out.

27. An apparatus for calibrating one or more color devices utilizing a computer system and one or more visible references comprising:
   a program executable by a computer system to enable a user to adjust color rendering of each of said one or more devices to subjectively match the one or more visible references, wherein said one or more visible references are not being rendered by said one or more devices being adjusted; and
   a sensor which enables measurement of one or more calibration parameters of said one or more devices whose color rendering was adjusted by the user, in which said one or more calibration parameters are in device independent units of color and usable in calibrating said one or more devices.

28. The apparatus according to claim 27 wherein said one or more color devices are two or more in number, and said one or more calibration parameters enable calibration of said color devices for use improving color matching between said devices.

29. The apparatus according to claim 27 wherein at least one of said one or more visible references represents a hard-copy image, at least one of said one or more color devices is a video monitor, and said program enables display of an image corresponding to said hard-copy image on the video monitor, and said program further comprises color editing software to enable the user to adjust color rendering on the video monitor until the user realizes a visual match between one or more aspects of said hard-copy image and said image on said video monitor.

30. A method for calibrating color rendering devices associated with one or more computer systems comprising the steps of:
  updating the calibration of at least one of said color rendering devices by one or more of modifying tone reproduction curves for one or more color channels, producing a color to color'transformation or performing calibration which includes characterization of color mixture properties;
  providing one or more visible references;
  adjusting color reproduction settings for said at least one of said color rendering devices in order to improve the subjective match of said one or more visible references to reproductions of said one or more visible references by said at least one of said color rendering devices, in which said one or more visible references are not being rendered by said one of said devices being adjusted, and said adjusting step adjusts information utilized for rendering a reproduction on said one of said devices without adjustment of any physical setting of said one of said devices; and
  storing said adjusted settings in device independent units in which said adjusted settings are useable to improve color matching between said color rendering devices.

31. The method according to claim 30 wherein said color to color'transformation comprises a gray balance correction.

32. The method according to claim 30 wherein said color rendering devices are different from each other in their rendering of color.

33. A computer-readable storage medium encoded with a computer program for calibrating one or more color devices comprising:
  a program executable by a computer system to enable a user to adjust color rendering of each of said one or more devices to subjectively match one or more visible references, wherein said one or more visible references are not being rendered by said one or more devices being adjusted; and
  said program receives data from a sensor representative of one or more calibration parameters of said one or more devices whose color rendering was adjusted by the user, in which said one or more calibration parameters are in device independent units of color and usable in calibrating said one or more devices.

34. The computer-readable storage medium according to claim 33 wherein said one or more color devices are two or more in number, and said one or more calibration parameters enable calibration of said color devices for use in improving color matching between said devices.

35. The computer-readable storage medium according to claim 33 wherein at least one of said one or more visible references represents a hard-copy image, at least one of said one or more color devices is a video monitor, and said program enables display of an image corresponding to said hard-copy image on the video monitor, and said program further comprises color editing software to enable the user to adjust color rendering on the video monitor until the user realizes a visual match between one or more aspects of said hard-copy image and said image on said video monitor.

* * * * *